(12) United States Patent
Fan et al.

(10) Patent No.: US 11,626,137 B1
(45) Date of Patent: Apr. 11, 2023

(54) HEAT ASSISTED MAGNETIC RECORDING (HAMR) WRITE HEAD CONTAINING A NEAR-FIELD TRANSDUCER WITH DIFFUSION BARRIER AND METHOD OF MAKING THEREOF

(71) Applicant: WESTERN DIGITAL TECHNOLOGIES, INC., San Jose, CA (US)

(72) Inventors: Wen Fan, Sunnyvale, CA (US); Thomas W. Clinton, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/588,758

(22) Filed: Jan. 31, 2022

(51) Int. Cl.
| | | |
|---|---|---|
| *G11B 11/105* | (2006.01) | |
| *G11B 5/60* | (2006.01) | |
| *G11B 13/08* | (2006.01) | |
| *G11B 5/31* | (2006.01) | |
| *G11B 5/00* | (2006.01) | |

(52) U.S. Cl.
CPC ............ *G11B 13/08* (2013.01); *G11B 5/3116* (2013.01); *G11B 2005/0021* (2013.01)

(58) Field of Classification Search
CPC ... G11B 5/314; G11B 5/3903; G11B 2220/90; G11B 2005/0021; G11B 5/48; G11B 11/10506; G11B 11/1051; G11B 5/127; G11B 5/31; G11B 11/10; G11B 11/105; G11B 13/08; G11B 5/4866; G11B 5/6088; G11B 5/6082; G11B 5/3912

USPC .................................................... 360/59, 328
See application file for complete search history.

(56) References Cited

U.S. PATENT DOCUMENTS

| | | |
|---|---|---|
| 8,291,743 B1 | 10/2012 | Shi et al. |
| 8,361,541 B2 | 1/2013 | Lee et al. |
| 8,443,510 B1 | 5/2013 | Shi et al. |
| 8,619,516 B1 | 12/2013 | Matsumoto |
| 8,717,709 B1 | 5/2014 | Shi et al. |
| 8,735,565 B2 | 5/2014 | Poyart et al. |
| 8,964,333 B1 | 2/2015 | Hu et al. |

(Continued)

FOREIGN PATENT DOCUMENTS

JP  2003-272103 A  9/2003

OTHER PUBLICATIONS

Notification of Transmittal of The International Search Report and Written Opinion of the International Searching Authority for International Patent Application No. PCT/US2022/030408, dated Oct. 25, 2022, 9 pages.

*Primary Examiner* — Nabil Z Hindi
(74) *Attorney, Agent, or Firm* — The Marbury Law Group PLLC

(57) ABSTRACT

A heat assisted magnetic recording (HAMR) write head includes a main pole, a waveguide, at least one dielectric matrix layer, and a near-field transducer disposed between the waveguide and the main pole. The near-field transducer is embedded in at least one dielectric matrix layer. The near-field transducer includes an antenna and a thermal shunt. The thermal shunt includes a thermal shunt body portion in direct contact with the antenna, and a metallic shunt diffusion barrier laterally surrounding the thermal shunt body portion and disposed between the thermal shunt body portion and the at least one dielectric matrix layer.

19 Claims, 18 Drawing Sheets

(56) References Cited

U.S. PATENT DOCUMENTS

| | | | |
|---|---|---|---|
| 9,153,261 B1 | 10/2015 | Kerner et al. | |
| 9,202,481 B1 * | 12/2015 | Matsumoto | G11B 5/6082 |
| 9,321,146 B1 | 4/2016 | Rudy et al. | |
| 9,390,733 B2 | 7/2016 | Etoh et al. | |
| 9,449,625 B1 | 9/2016 | Vossough et al. | |
| 10,354,681 B1 | 7/2019 | Chien et al. | |
| 10,460,750 B1 | 10/2019 | Zhang et al. | |
| 10,629,230 B2 | 4/2020 | Li et al. | |
| 10,755,733 B1 | 8/2020 | Zheng et al. | |
| 11,127,421 B1 | 9/2021 | Siangchaew et al. | |
| 2004/0097173 A1 | 5/2004 | Crawforth et al. | |
| 2007/0230063 A1 | 10/2007 | Seagle | |
| 2011/0294398 A1 | 12/2011 | Hu et al. | |
| 2014/0355400 A1 | 12/2014 | Balamane et al. | |
| 2015/0036470 A1 | 2/2015 | Balamane et al. | |
| 2015/0260757 A1 | 9/2015 | Li et al. | |
| 2016/0329068 A1 | 11/2016 | Matsumoto et al. | |
| 2018/0308514 A1 | 10/2018 | Li et al. | |
| 2019/0348068 A1 | 11/2019 | Zhang et al. | |
| 2019/0378539 A1 | 12/2019 | Matsumoto et al. | |
| 2021/0027808 A1 | 1/2021 | Matsumoto et al. | |

\* cited by examiner

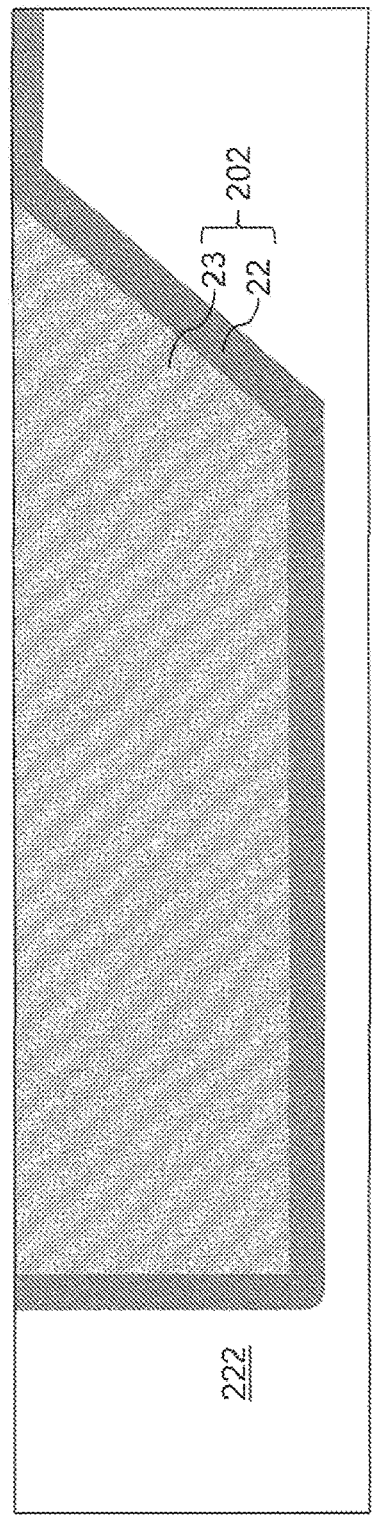

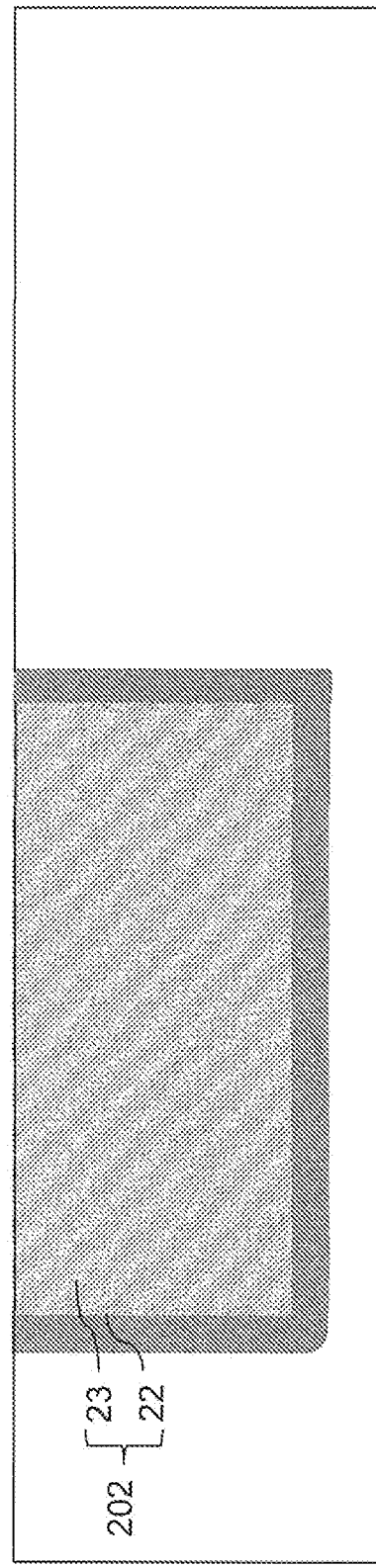

HEAT ASSISTED MAGNETIC RECORDING (HAMR) WRITE HEAD CONTAINING A NEAR-FIELD TRANSDUCER WITH DIFFUSION BARRIER AND METHOD OF MAKING THEREOF

FIELD

The present disclosure relates generally to the field of hard disk drives, and particularly to a HAMR write head including a near-field transducer containing a diffusion barrier and methods of manufacturing the same.

BACKGROUND

Magnetic heads are employed to operate hard disk drives. A magnetic head can include a reading (i.e., read) head and a recording (i.e., writing or write) head. General structures and method of manufacture for prior art heat assisted magnetic recording (HAMR) write heads are disclosed, for example, in U.S. Patent Application Publication No. 2019/0378539 A1, the entire content of which is incorporated herein by reference.

In a magnetic disk device that employs a heat assisted magnetic recording (HAMR) write head, a near-field transducer (NFT) may be utilized to locally heat magnetic media having high coercivity during recording to lower the coercivity of the localized region. Gold is typically used for the NFT material to achieve a high optical efficiency, but the melting point of gold is low and deformation of the NFT is a problem when the NFT is heated for a long time. The NFT temperature is especially high near the point where the optical near-field is generated, and the maximum temperature may reach more than 150 degrees Celsius over the operational temperature of the magnetic disk device. When the NFT temperature is more than 150 degrees Celsius over the operational temperature of the magnetic disk device, atomic diffusion of gold atoms via surface, grain boundary, or lattice increases significantly, causing the NFT to deform.

SUMMARY

According to an aspect of the present disclosure, a heat assisted magnetic recording (HAMR) write head includes a main pole, a waveguide, at least one dielectric matrix layer, and a near-field transducer disposed between the waveguide and the main pole, and embedded in at least one dielectric matrix layer. The near-field transducer includes an antenna and a thermal shunt. The thermal shunt includes a thermal shunt body portion in direct contact with the antenna and a metallic shunt diffusion barrier laterally surrounding the thermal shunt body portion and disposed between the thermal shunt body portion and the at least one dielectric matrix layer.

According to yet another aspect of the present disclosure, a method of forming a heat assisted magnetic recording (HAMR) write head is provided. The method comprises: forming a waveguide over a substrate; forming a near-field transducer embedded in a first dielectric matrix layer over the waveguide; forming a second dielectric matrix layer over the near-field transducer and the first dielectric matrix layer; forming a via cavity through the second dielectric matrix layer over the near-field transducer; forming metallic shunt diffusion barrier on a sidewall of the via cavity; forming a thermal shunt body portion directly on the near-field transducer and on an inner sidewall of the metallic shunt diffusion barrier, whereby a combination of the metallic shunt diffusion barrier and the thermal shunt body portion comprises a thermal shunt; and forming a main pole on the thermal shunt.

BRIEF DESCRIPTION OF THE DRAWINGS

FIGS. 6A-6F are sequential cross-sectional views of the near-field transducer containing an antenna and a thermal shunt during a manufacture process along a cross-sectional plane X1 in FIG. 5A.

FIGS. 7A-7F are sequential cross-sectional views of the near-field transducer containing the antenna and the thermal shunt during a manufacture process along a cross-sectional plane X2 in FIG. 5A.

DETAILED DESCRIPTION

Figure 1A:
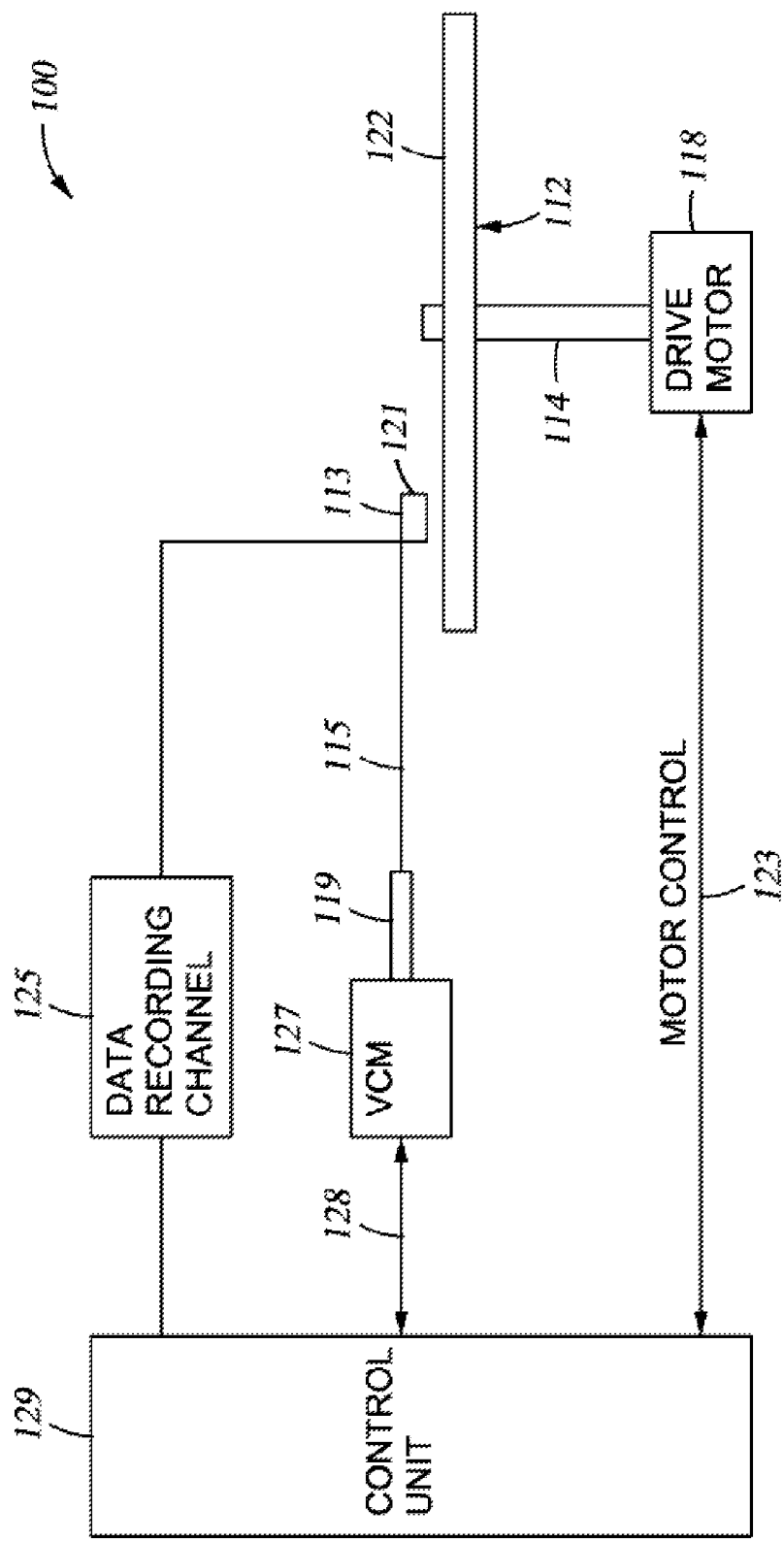
FIGS. 1A and 1B illustrate a disk drive system according to embodiments of the present disclosure.

As described above, the embodiments of the present disclosure are directed to a read head containing a near-field transducer including a diffusion barrier for heat-assisted magnetic recording and methods of manufacturing the same, the various aspects of which are described below in detail. The diffusion barrier is discontinuous to provide effective transfer of heat between the antenna and the thermal shunt portions of the near-field transducer while minimizing heat loss into regions surrounding the near-field transducer.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure. The same reference numerals refer to the same element or similar element. Unless otherwise indicated, elements having the same reference numerals are presumed to have the same composition. As used herein, a first element located "on" a second element can be located on the exterior side of a surface of the second element or on the interior side of the second element. As used herein, a first element is located "directly on" a second element if there exists a physical contact between a surface of the first element and a surface of the second element.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

FIG. 1A illustrates a disk drive 100 according to an embodiment of the present disclosure. As shown, at least one rotatable magnetic media 112 is supported on a spindle 114 and rotated by a disk drive motor 118. The magnetic recording on each media is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121 that may include a radiation source (e.g., a laser or LED) for heating the media surface 122. As the magnetic media 112 rotates, the slider 113 moves radially in and out over the media surface 122 so that the magnetic head assembly 121 may access different tracks of the magnetic media 112 to read or record data. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129.

During operation of a HAMR enabled disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 slightly above the media 112 surface by a small, substantially constant spacing during normal operation. The radiation source heats up the high-coercivity media so that the write elements of the magnetic head assembly 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of media and actuators, and each actuator may support a number of sliders.

Figure 1B:
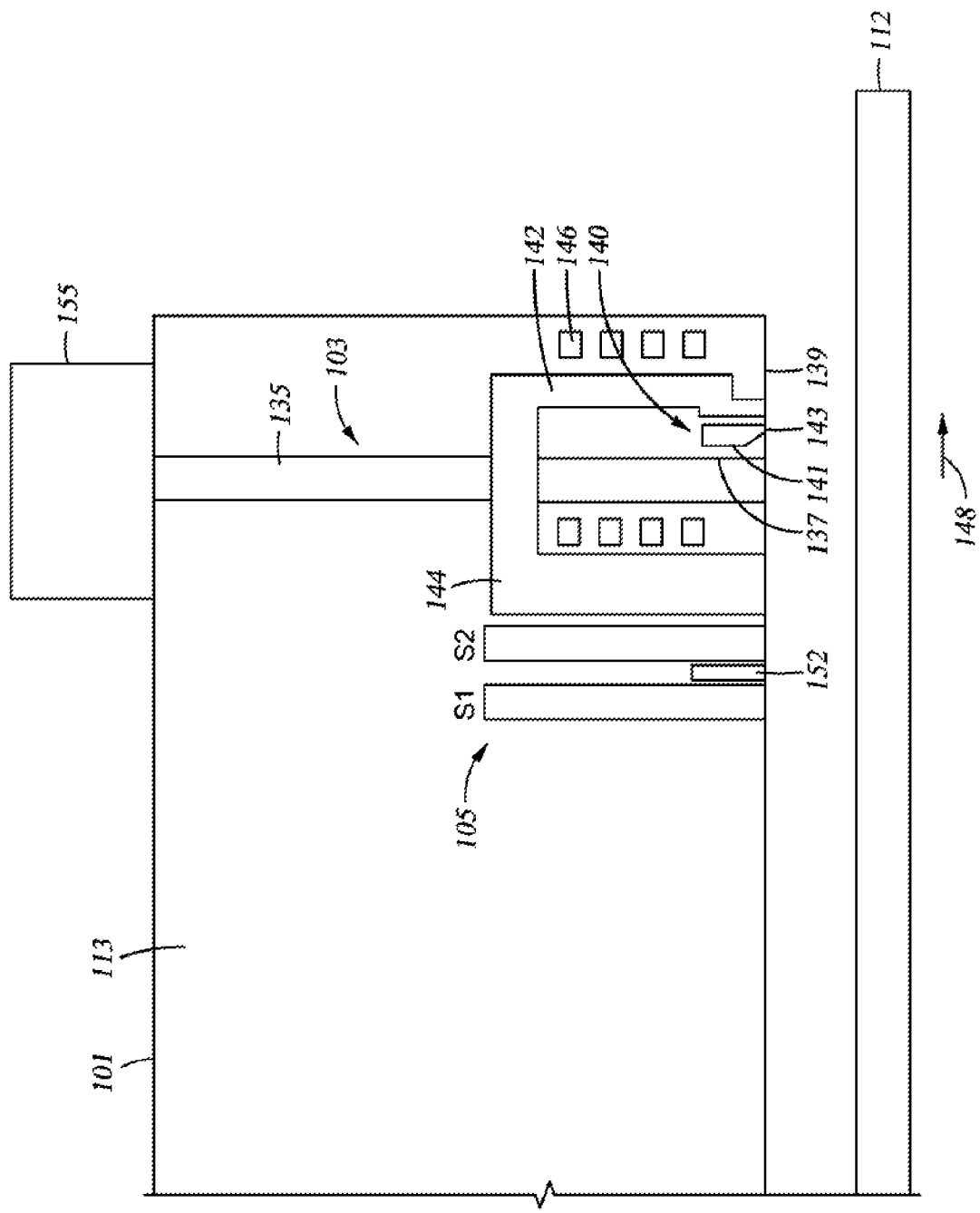

FIG. 1B is a fragmented, cross sectional side view of a HAMR read/write head 101 and magnetic media 112 of the disk drive 100 of FIG. 1A. The read/write head 101 may correspond to the magnetic head assembly 121 described in FIG. 1A. The read/write head 101 includes a media facing surface (MFS) 139, such as an air bearing surface (ABS) or a gas bearing surface (GBS), a write head 103 and a magnetic read head 105, and is mounted on the slider 113 such that the MFS 139 is facing the magnetic media 112. As shown in FIG. 1B, the magnetic media 112 moves past the write head 103 in the direction indicated by the arrow 148. As shown in FIG. 1B and subsequent figures, the X direction denotes an along-the-track direction, the Y direction denotes a track width or cross-track direction, and the Z direction denotes a direction substantially perpendicular to the MFS 139.

In some embodiments, the magnetic read head 105 is a magnetoresistive (MR) read head that includes an MR sensing element 152 located between MR shields S1 and S2. In other embodiments, the magnetic read head 105 is a magnetic tunnel junction (MTJ) read head that includes an MTJ sensing element 152 located between MR shields S1 and S2. The magnetic fields of the adjacent magnetized regions in the magnetic media 112 are detectable by the MR (or MTJ) sensing element 152 as the recorded bits.

The write head 103 includes a main pole 142, a waveguide 135, a NFT 140 disposed between the main pole 142 and the waveguide 135, a return pole 144, and a coil 146 that excites the main pole 142. A spot size converter (not shown) may be coupled to the NFT 140 and may be substantially parallel to the waveguide 135. The write head 103 may be operatively attached to a laser 155 (i.e., a radiation source). The laser 155 may be placed directly on the write head 103 or radiation may be delivered from the laser 155 located separate from the slider 113 through an optical fiber or waveguide. The waveguide 135 is a channel that transmits the radiation through the height of the write head 103 to the NFT 140 (e.g., a plasmonic device or optical transducer) which is located at or near the MFS 139. When radiation, such as a laser beam, is introduced into the waveguide 135, an evanescent wave is generated at a surface 137 of the waveguide 135 that couples to a surface plasmon excited on a surface 141 of the NFT 140. The surface plasmon propagates to a surface 143 of the NFT 140, and an optical near-field spot is generated near an apex (not shown) of the surface 143. In other embodiments, the waveguide 135 may not extend to the MFS 139, and the NFT 140 may be disposed at an end of the waveguide 135, so the NFT 140 is aligned with the waveguide 135. The embodiments herein, however, are not limited to any particular type of radiation source or technique for transferring the energy emitted from the radiation source to the MFS 139. The NFT 140 as shown in FIG. 1B is a nanobeak NFT. However, the NFT 140 is not limited to any particular type of NFT. In some embodiments, the NFT 140 is an e-antenna NFT or a lollipop NFT.

Figure 2A:
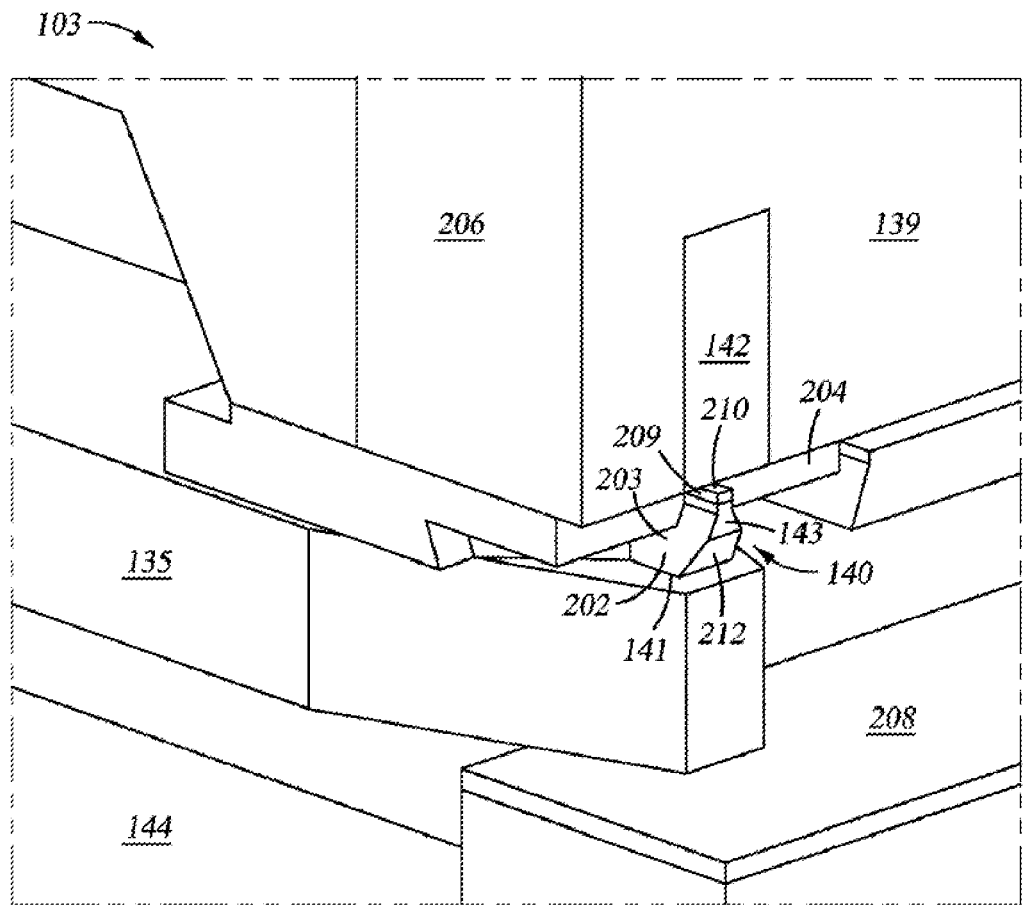
FIGS. 2A and 2B illustrate a heat assisted magnetic recording (HAMR) write head according to an embodiment of the present disclosure.

FIG. 2A is a fragmented perspective view of the HAMR write head 103, according to one embodiment described herein. To better illustrate certain components of the write head 103, a cladding material and a spacer layer are omitted. The write head 103 includes the return pole 144, the waveguide 135, the NFT 140, and the main pole 142. The NFT 140 may include an antenna 202. The write head 103 may further include a thermal shunt 204 coupled to the antenna 202, and the thermal shunt 204 may be disposed between the antenna 202 and the heat sink 206. The thermal shunt 204 may be made of a high-thermal-conductivity material. The write head 103 may further include a heat sink 206 surrounding the main pole 142 and a mirror layer 208 disposed on a surface of the return pole 144. The antenna 202 may include the surface 143 at the MFS 139, the surface 141 facing the waveguide 135, a surface 210 facing the main pole 142, and a surface 212 connecting the surface 143 and the surface 141.

The antenna 202 may also include a first portion 203 and a second portion 209. The second portion 209 may be a layer within the antenna 202 and may include the surface 210. The first portion 203 of the antenna 202 may be made of a metal, such as gold (Au), silver (Ag), copper (Cu) or aluminum (Al). The second portion 209 may be made of a material having a melting point that is greater than the melting point of the metal of the first portion 203, and the material of the second portion 209 may be immiscible in the material of the first portion 203. The second portion 209 may be made of an element or an alloy. In one embodiment, the second portion 209 is made of an element, such as Rh, Co, Ni, Pt, Pd, Ru, B, Mo, W, Ti, Ir, or Re. In other embodiments, the second portion 209 is made of an alloy. The alloy of the second portion 209 may include one or more metals, such as Rh, Co, Ni, Pt, Pd, Ru, B, Mo, W, Ti, Ir, Re, Au, Ag, Cu, or Al. In some embodiments, the alloy of the second portion 209 may include one or more metals and one or more alloying elements. The one or more metals of the alloy may be the same as the metal used for the first portion 203. Alternatively, the one or more metals of the alloy may include multiple metals. The one or more alloying elements may be any suitable material, such as Rh, Co, Ni, Pt, Pd, Ru, B, Mo, W, Ti, Ir, or Re. In some embodiments, the alloy is a gold alloy, such as AuRh, AuCo, or AuNi. In some embodiments, a ternary alloy is used to form the second portion 209, and the ternary alloy includes a metal alloyed with two alloying elements, or two metals with one alloying element, such as AgPdCu. In some embodiments, multiple metals are mixed with one or more alloying elements, such as AuAgCuIr or AuAgCuIrPd.

Figure 2B:
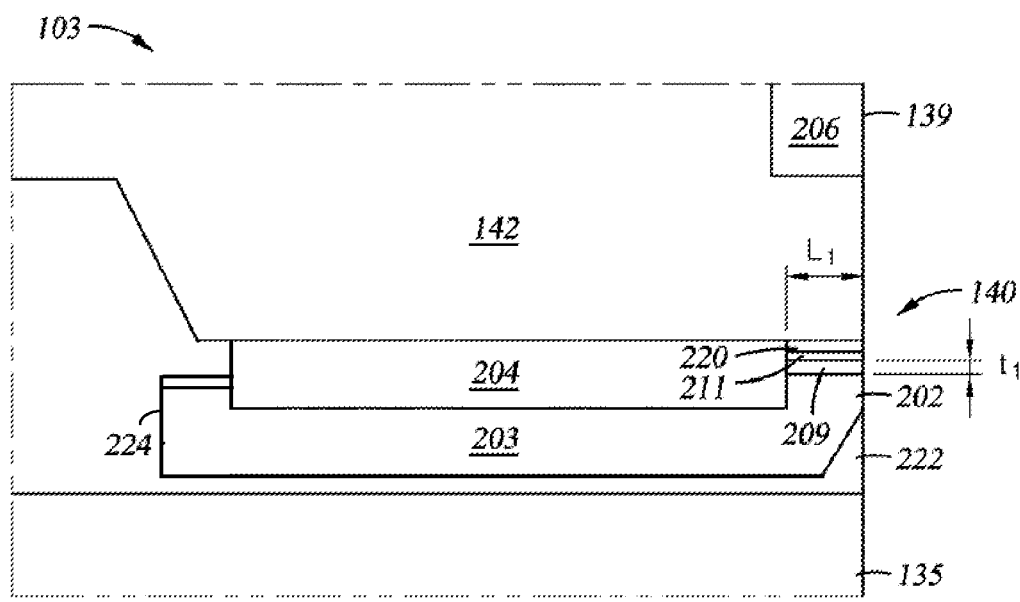

FIG. 2B is a fragmented cross-sectional view of the HAMR write head 103, according to one embodiment described herein. The write head 103 may include a cladding material 222 disposed between the waveguide 135 and the antenna 202, and the NFT 140 may include a spacer layer 220 disposed between the antenna 202 and the main pole 142. Both the cladding material 222 and the spacer layer 220 may be made of a dielectric material such as alumina, silicon oxide, silicon nitride, silicon oxynitride, or combinations thereof. The antenna 202 includes the first portion 203 and the second portion 209. An adhesion layer 211 may be disposed between the second portion 209 and the spacer layer 220, and the adhesion layer 211 may be made of any suitable material, such as Ta, Ti, Cr, Ni, Co, Hf, Zr, oxide of the materials mentioned thereof, or nitride of the materials mentioned thereof. The second portion 209 may have a length $L_1$ extending from the MFS 139 to a location away from the MFS 139. The length $L_1$ may be equal to or less than the distance between the thermal shunt 204 and the MFS 139. The length $L_1$ may range from about 30 nm to about 150 nm. When light is introduced into the antenna 202, charges in the antenna 202 are concentrated in the second portion 209 at the MFS 139, and large amount of heat is generated at MFS 139 in the second portion 209. If the second portion 209 extends to a back edge 224 of the antenna 202, heat flow to the heat sink 206 is reduced, and the temperature of the NFT 140 increases. Thus, by reducing the length $L_1$ of the second portion 209, the heat flow to the heat sink 206 is improved and the temperature of the NFT 140 is reduced.

The second portion 209 of the antenna 202 may have a thickness $t_1$ ranging from about 3 angstroms to about 50 nm. In one embodiment, the second portion 209 is made of an element, such as Rh, Co, Ni, Pt, Pd, Ru, B, Mo, W, Ti, Ir or Re, and the thickness t1 of the second portion 209 is less than about 3 nm, such as from 3 to 5 angstroms. In another embodiment, the second portion 209 is made of an alloy as described above, and the thickness $t_1$ of the second portion 209 is less than 50 nm, such as about 3 to 5 nm.

Figure 3A:
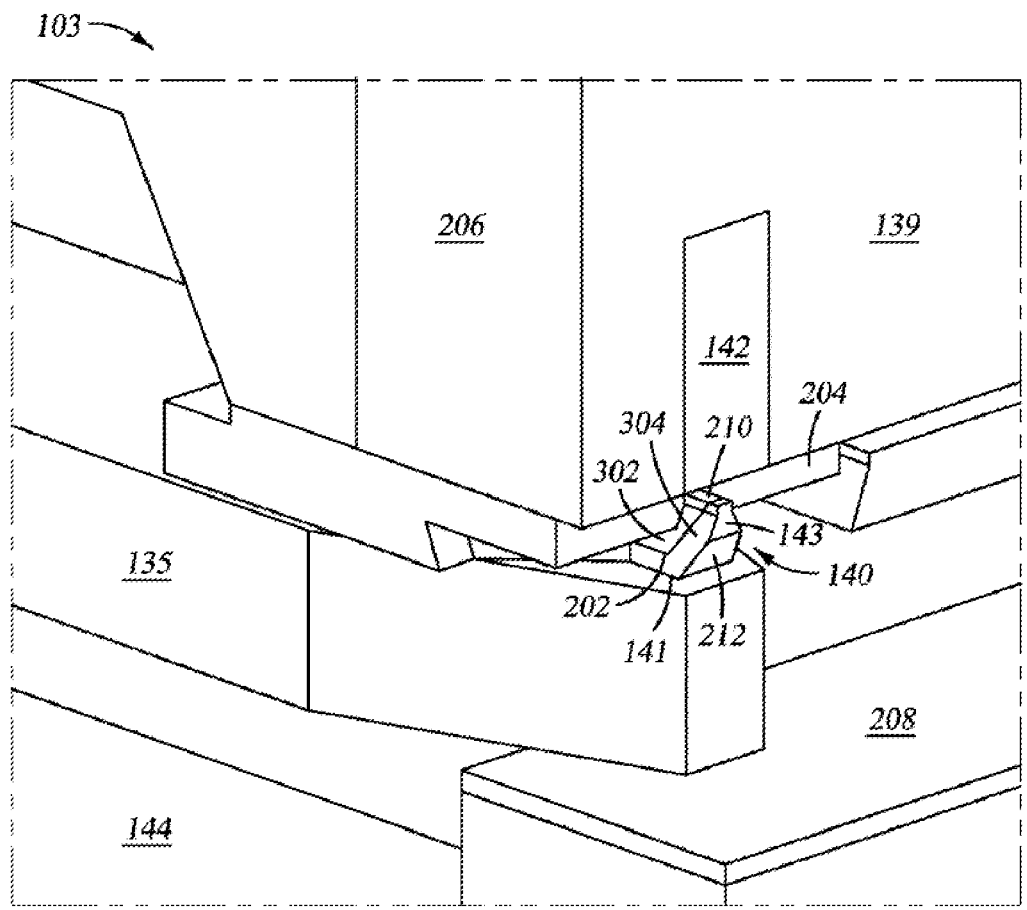
FIGS. 3A and 3B illustrate the HAMR write head according to an embodiment of the present disclosure.

FIG. 3A is a fragmented perspective view of the HAMR write head 103, according to one embodiment described herein. Again, the cladding material and the spacer layer are omitted. The antenna 202 may include a first portion 302 and a second portion 304. The first portion 302 may be made of the same material as the first portion 203 (FIG. 2A), and the second portion 304 may be made of the same material as the second portion 209 (FIG. 2A). The second portion 304 may be a layer within the antenna 202 and may include a portion of the surface 210, the entire surface 143, the entire surface 212 and a portion of the surface 141.

Figure 3B:
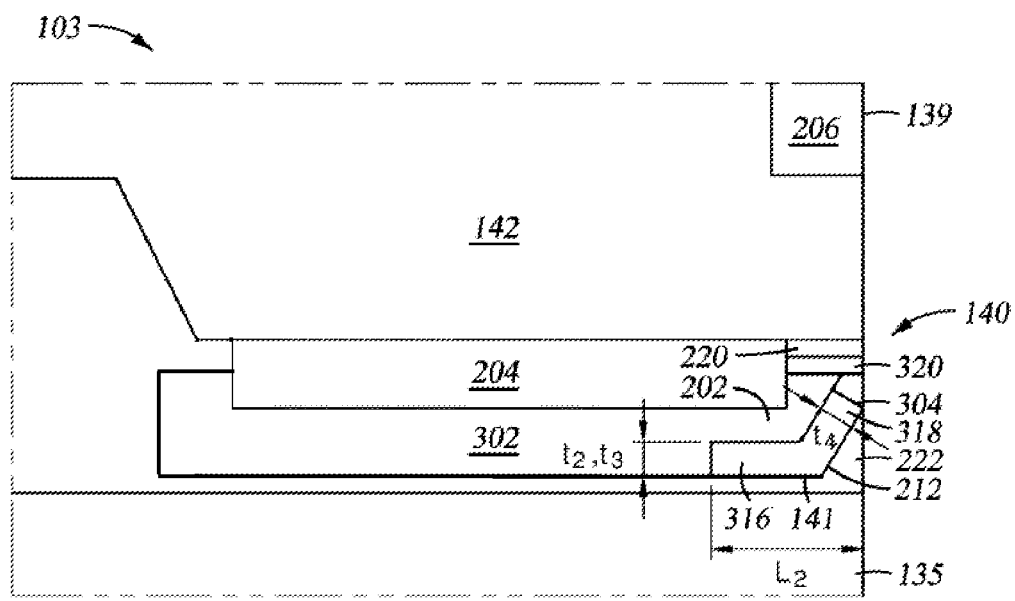

As shown in FIG. 3B, an adhesion layer 320 may be disposed between the antenna 202 and the spacer layer 220, and the adhesion layer 320 may be made of the same material as the adhesion layer 211. The second portion 304 of the antenna 202 may have a substantially uniform thickness $t_2$ that is less than about 100 nm, such as ranging from about 3 angstroms to about 50 nm. In one embodiment, the second portion 304 is made of an element, such as Rh, Co, Ni, Pt, Pd, Ru, B, Mo, W, Ti, Ir or Re, and the thickness $t_2$ of the second portion 304 is less than about 3 nm, such as 3 to 5 angstroms. In another embodiment, the second portion 304 is made of an alloy as described above, and the thickness $t_2$ of the second portion 304 is less than 50 nm. In some embodiments, the second portion 304 may have varying thicknesses. The second portion 304 may include a portion 316 that includes a portion of the surface 141, and the portion 316 of the second portion 304 has a thickness $t_3$. The second portion 304 may include a portion 318 that includes the surface 212, and the portion 318 of the second portion 304 has a thickness $t_4$. The thicknesses $t_3$ and $t_4$ may be different. The second portion 304 may have a length $L_2$ extending from the MFS 139 to a location away from the MFS 139. The length $L_2$ may range from about 50 nm to about 150 nm.

Figure 4A:
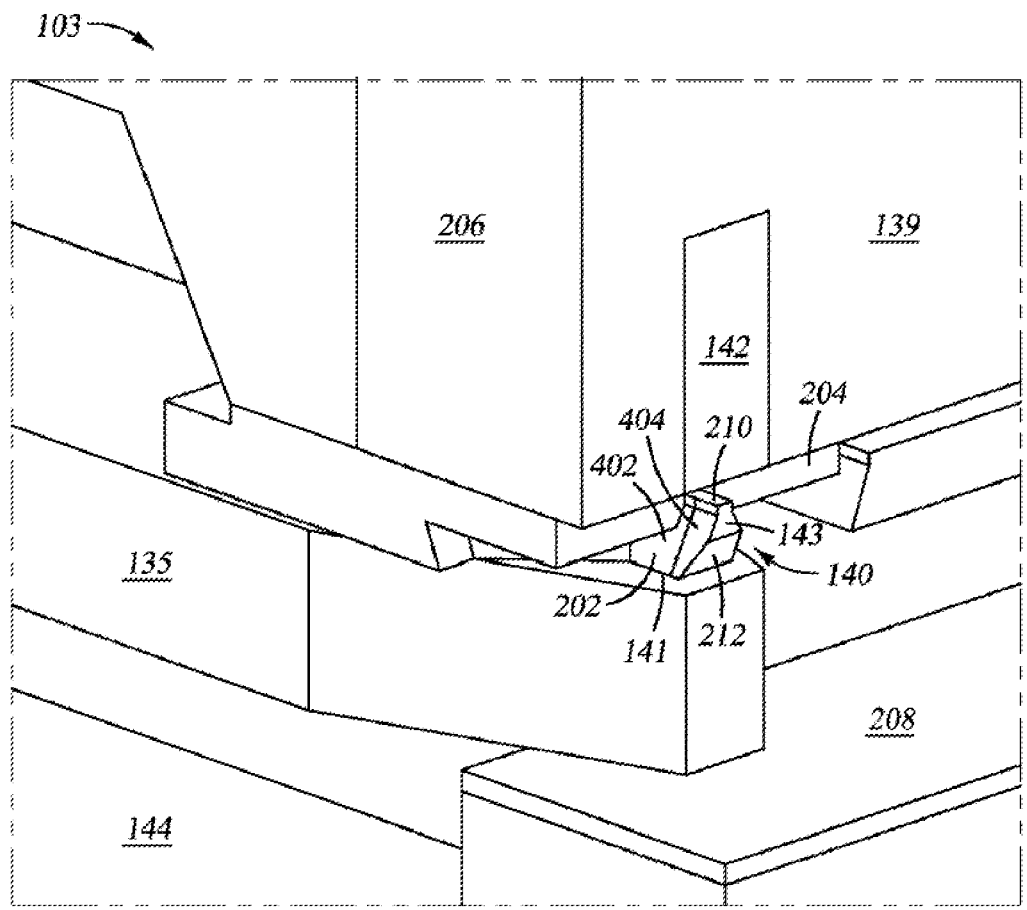
FIGS. 4A and 4B illustrate the HAMR write head according to an embodiment of the present disclosure.

FIG. 4A is a fragmented perspective view of the HAMR write head 103 according to one embodiment. The antenna 202 may include a first portion 402 and a second portion 404. The first portion 402 may be made of the same material as the first portion 203 (FIG. 2A), and the second portion 404 may be made of the same material as the second portion 209 (FIG. 2A). The second portion 404 may include a portion of the surface 210, the entire surface 143, the entire surface 212 and a portion of the surface 141.

Figure 4B:
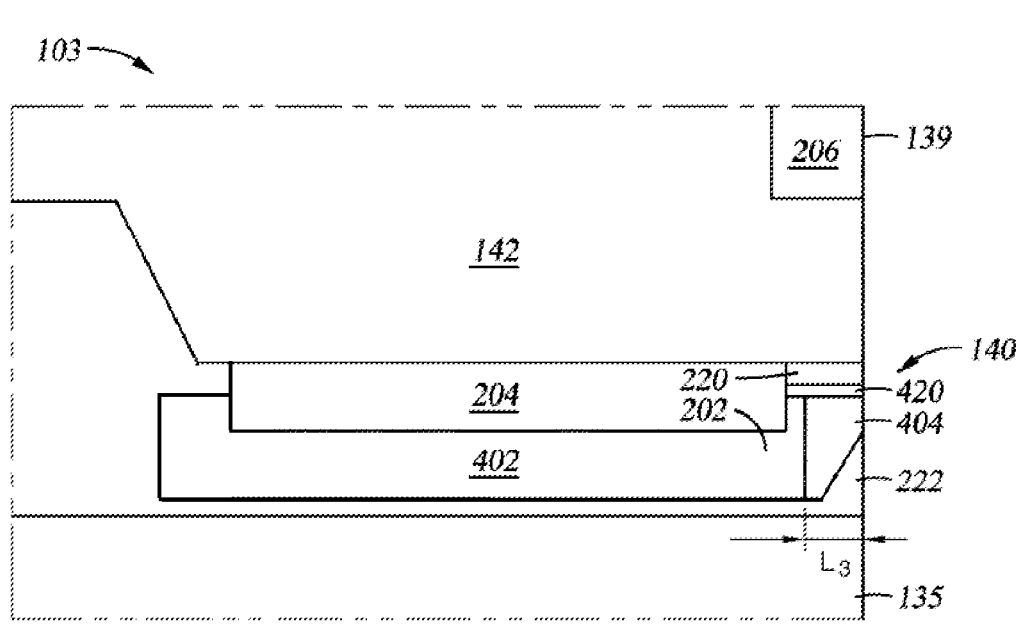

As shown in FIG. 4B, an adhesion layer 420 may be disposed between the antenna 202 and the spacer layer 220, and the adhesion layer 420 may be made of the same material as the adhesion layer 211. The second portion 404 of the antenna 202 may have a length L3 extending from the MFS 139 to a location away from the MFS 139. The length L3 may range from about 50 nm to about 150 nm.

Figure 5B:
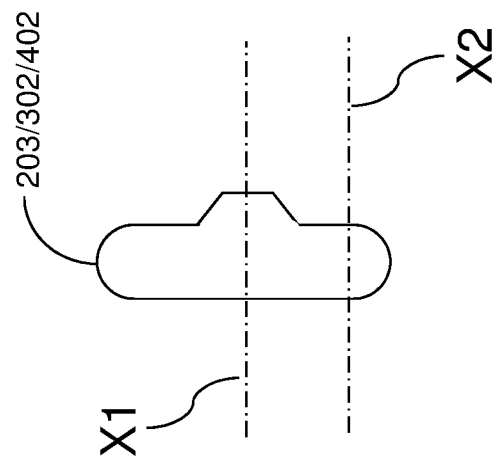
FIG. 5B is top down cross-sectional view of the near-field transducer along the plane B of FIG. 5A.
Figure 5A:
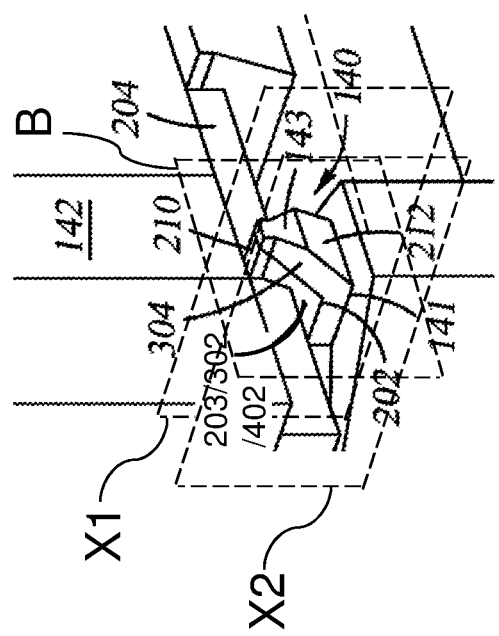
FIG. 5A is a perspective view of a region around a near-field transducer within the HAMR write heads of FIGS. 2A, 2B, 3A, 3B, 4A, and 4B according to an embodiment of the present disclosure.

FIG. 5A is a perspective view of a region around a near-field transducer 140 within the HAMR write heads 103 of FIGS. 2A, 2B or FIGS. 3A, 3B or FIGS. 4A, 4B according to an embodiment of the present disclosure. FIG. 5B is a top down cross-sectional view of the near-field transducer along plane B in FIG. 5A.

According to an aspect of the present disclosure, the near-field transducer 140 illustrated in FIGS. 5A and 5B may be formed employing a series of processing steps that are illustrated in FIGS. 6A-6F and FIGS. 7A-7F. FIGS. 6A-6F are sequential cross-sectional views of the near-field transducer 140 during a manufacture process along a cross-sectional plane X1 in FIG. 5A. FIGS. 7A-7F are sequential cross-sectional views of the near-field transducer 140 during a manufacture process along a cross-sectional plane X2 in FIG. 5A. The near-field transducer 140 includes the antenna 202 and the thermal shunt shown in FIGS. 2A to 4B.

Figure 6B:
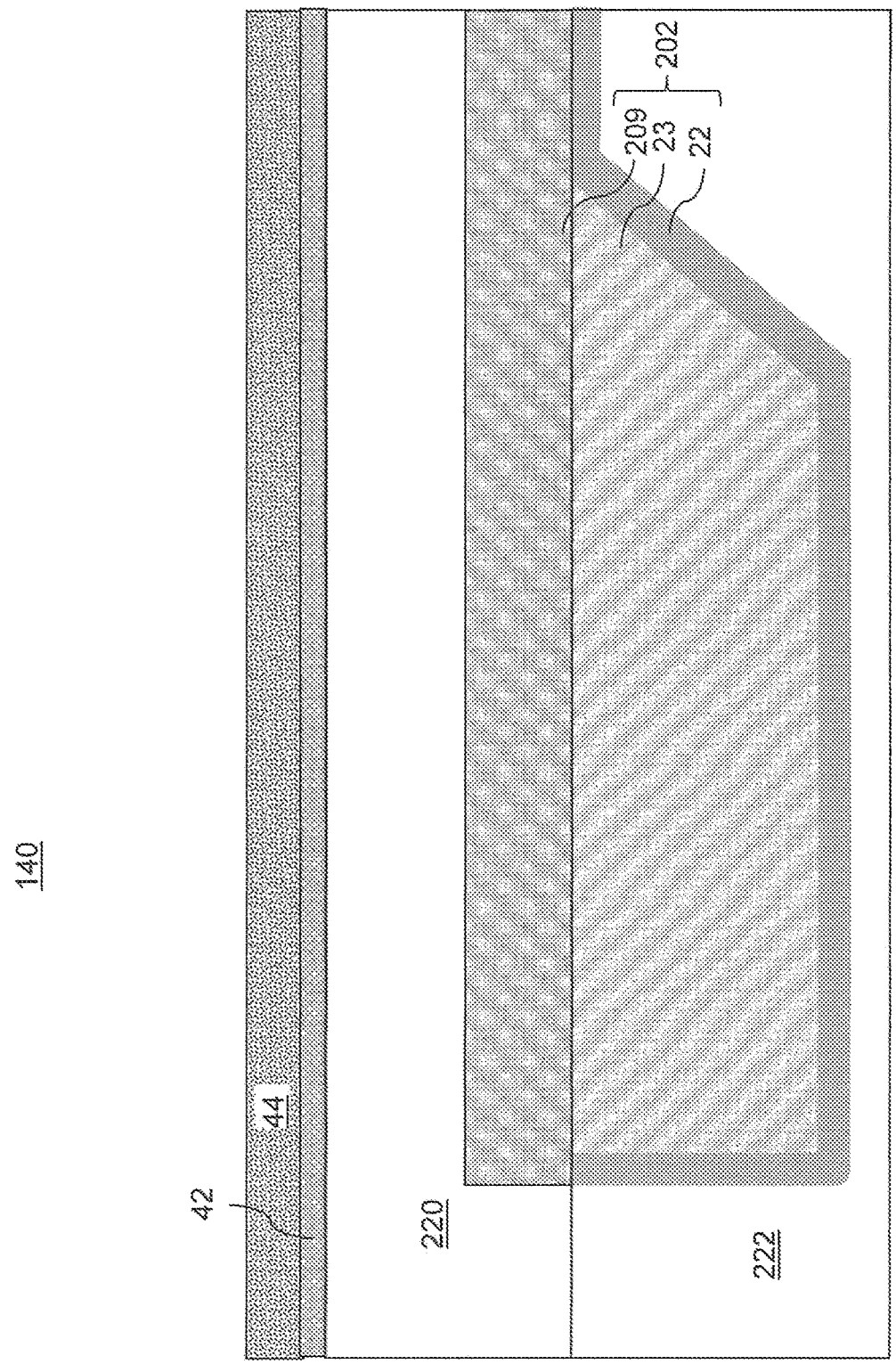
Figure 6C:
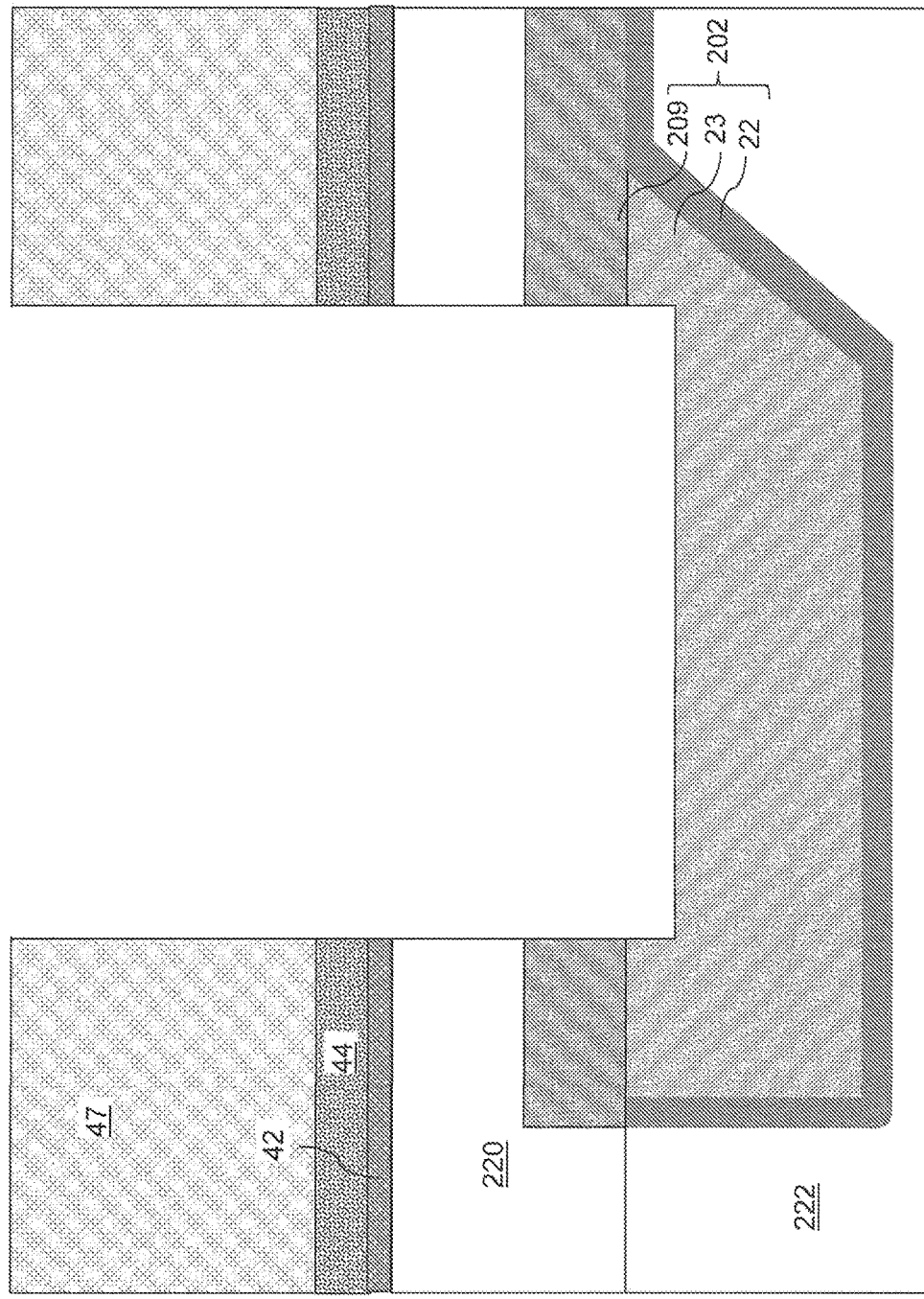
Figure 6D:
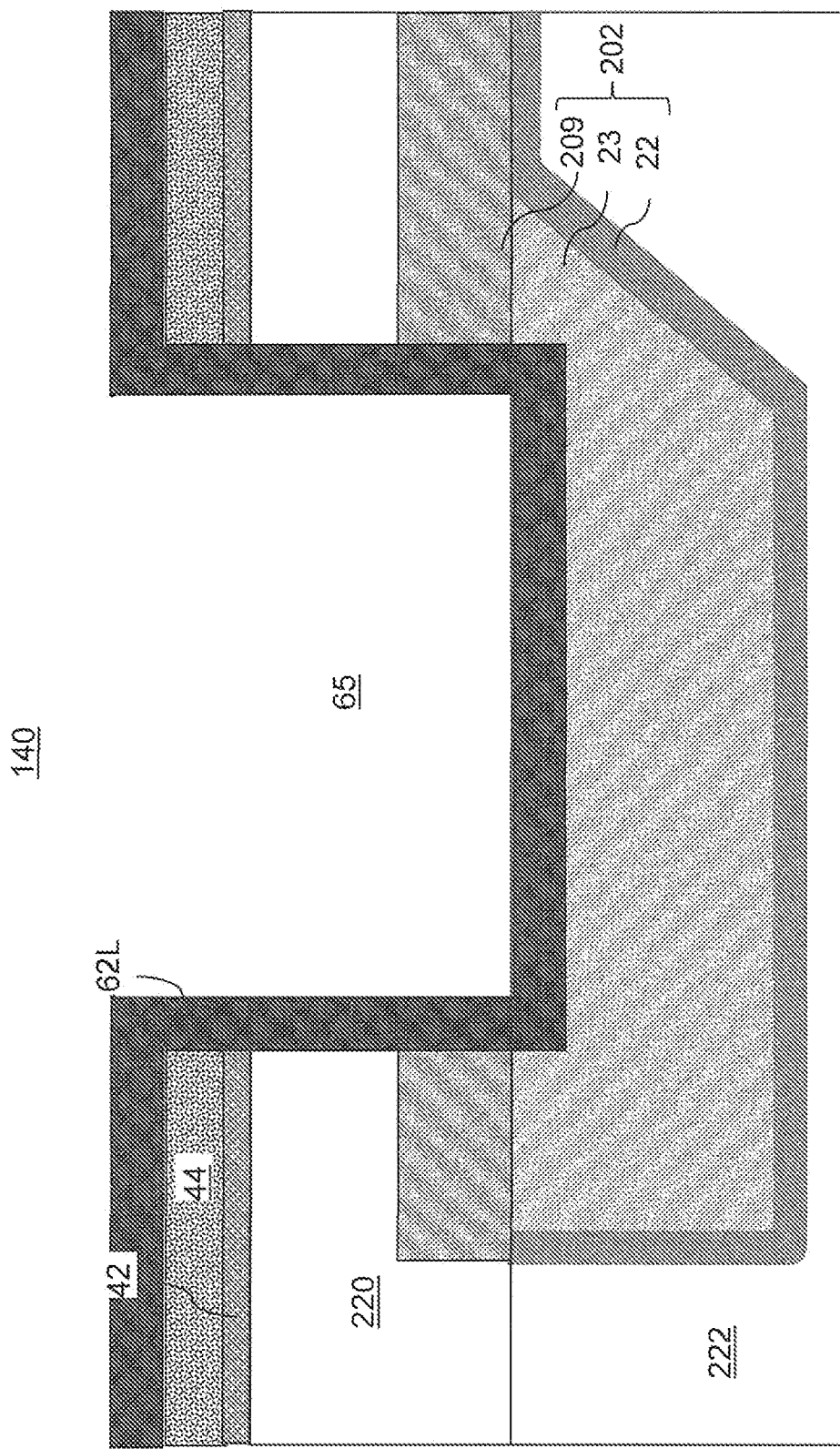
Figure 6E:
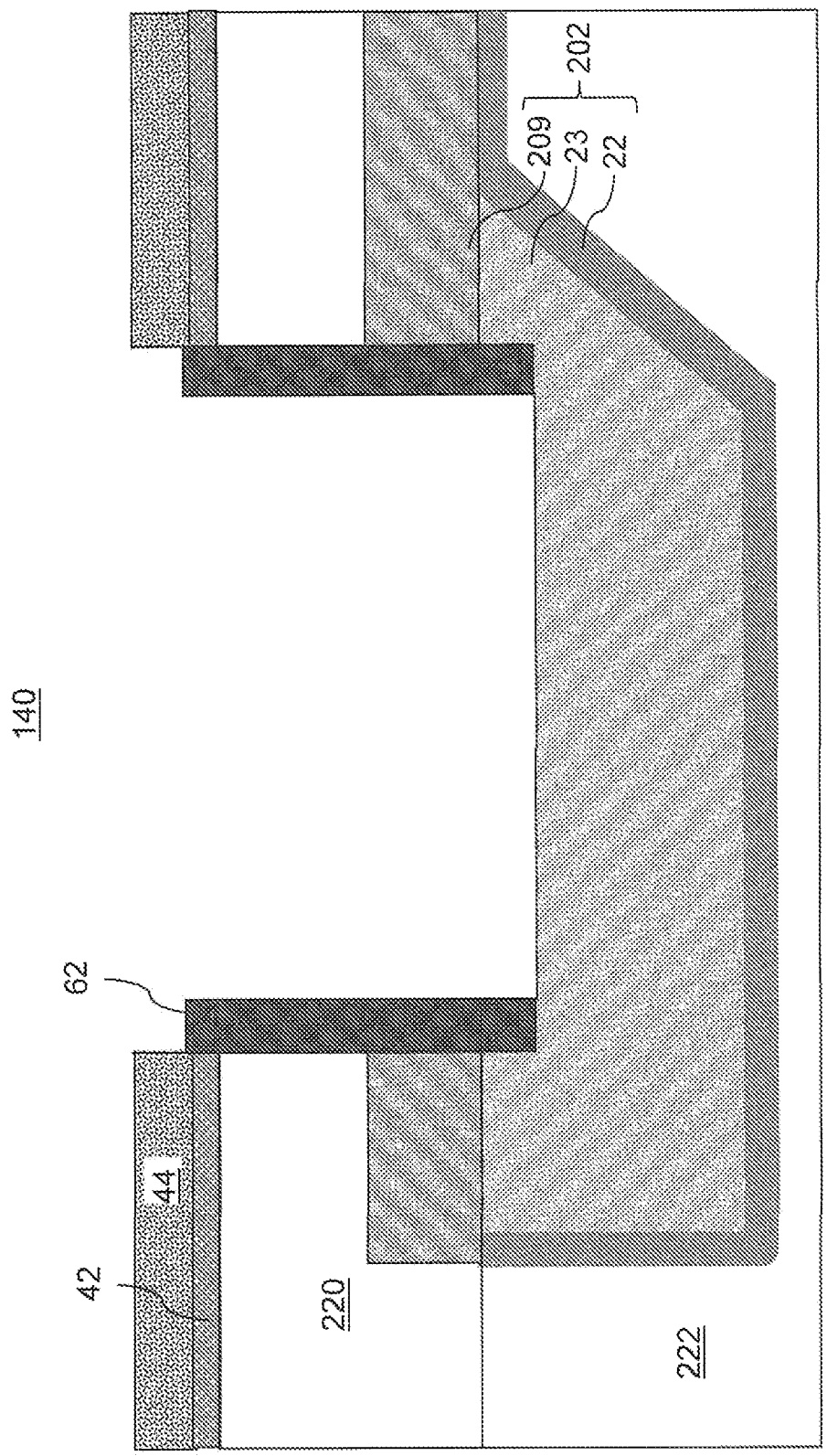
Figure 6F:
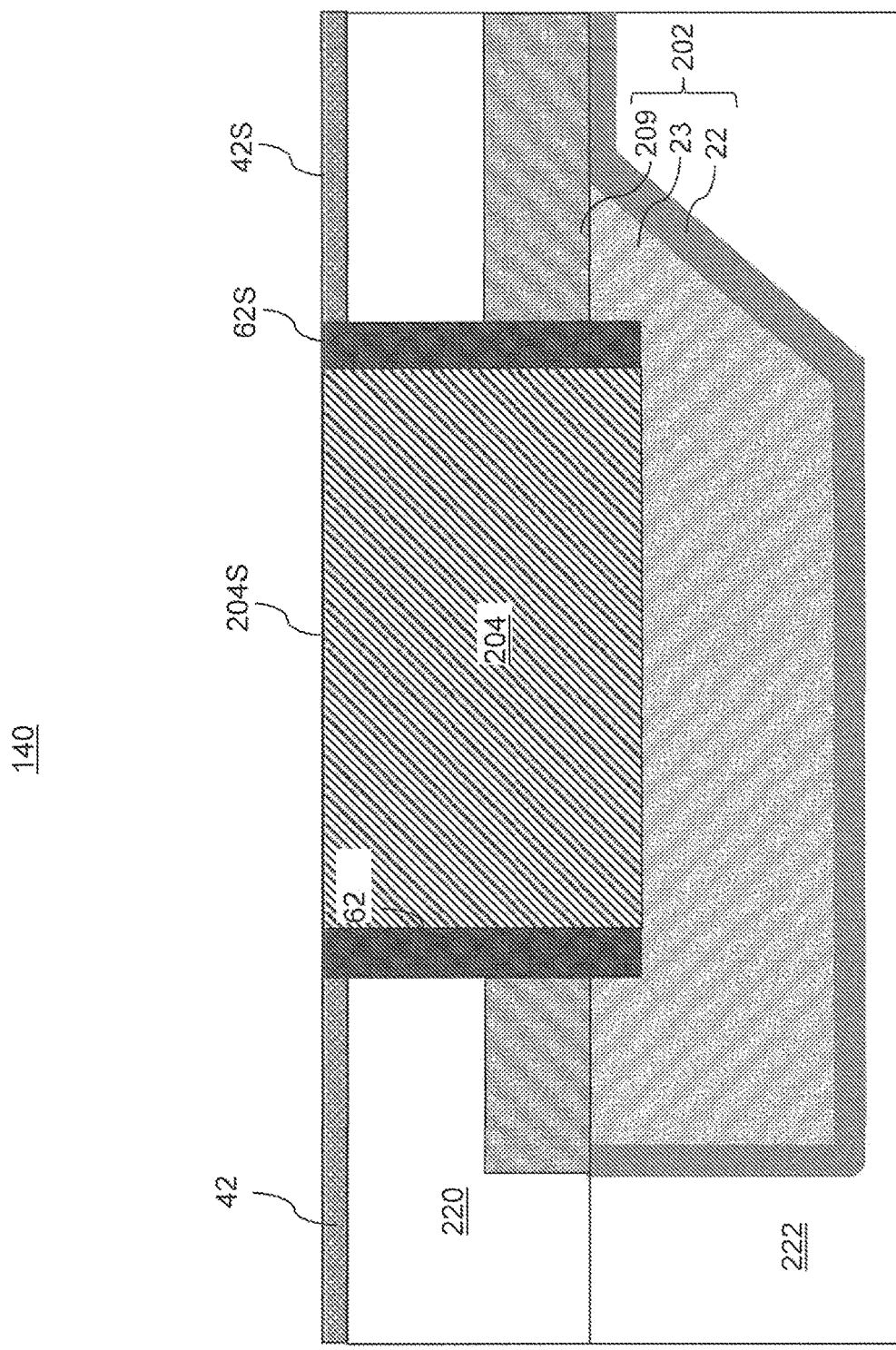
Figure 7B:
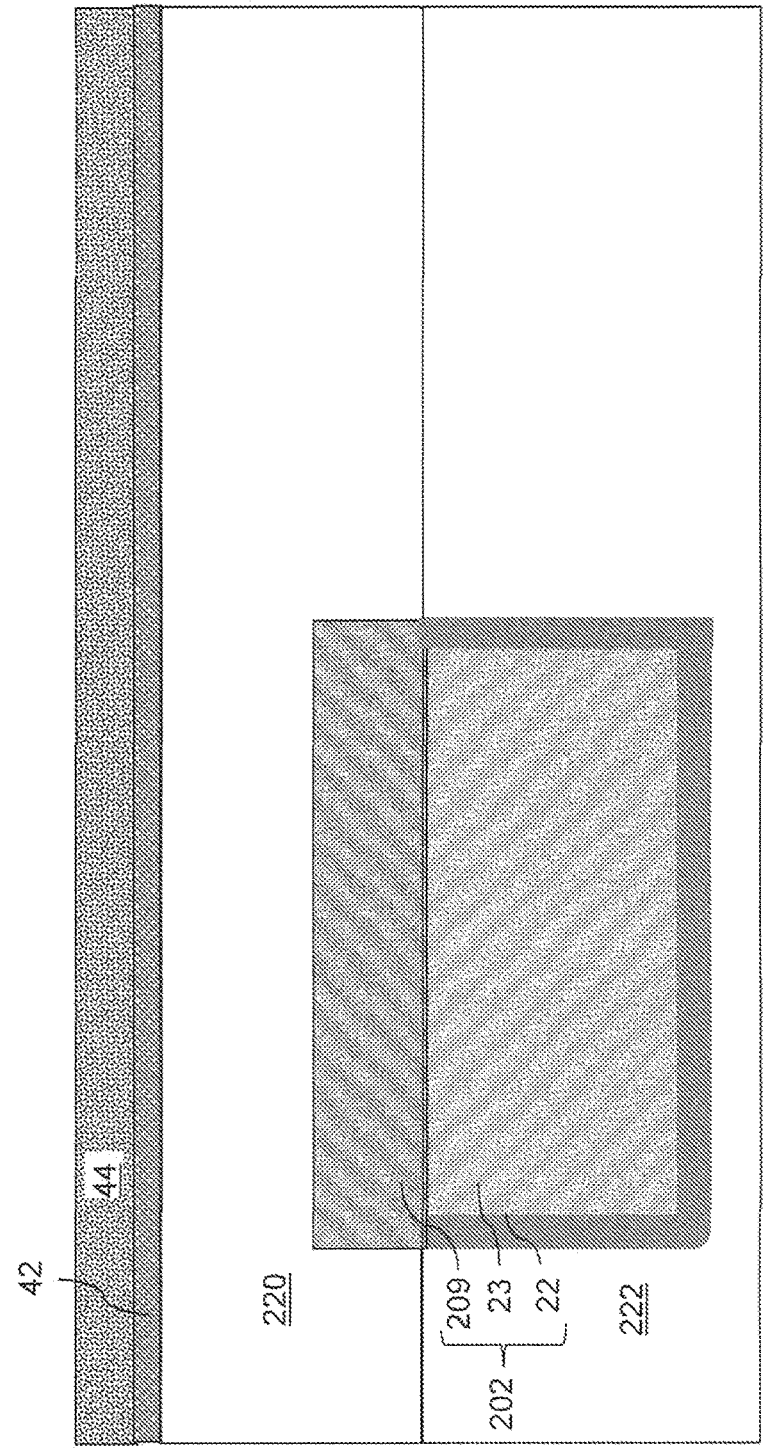
Figure 7C:
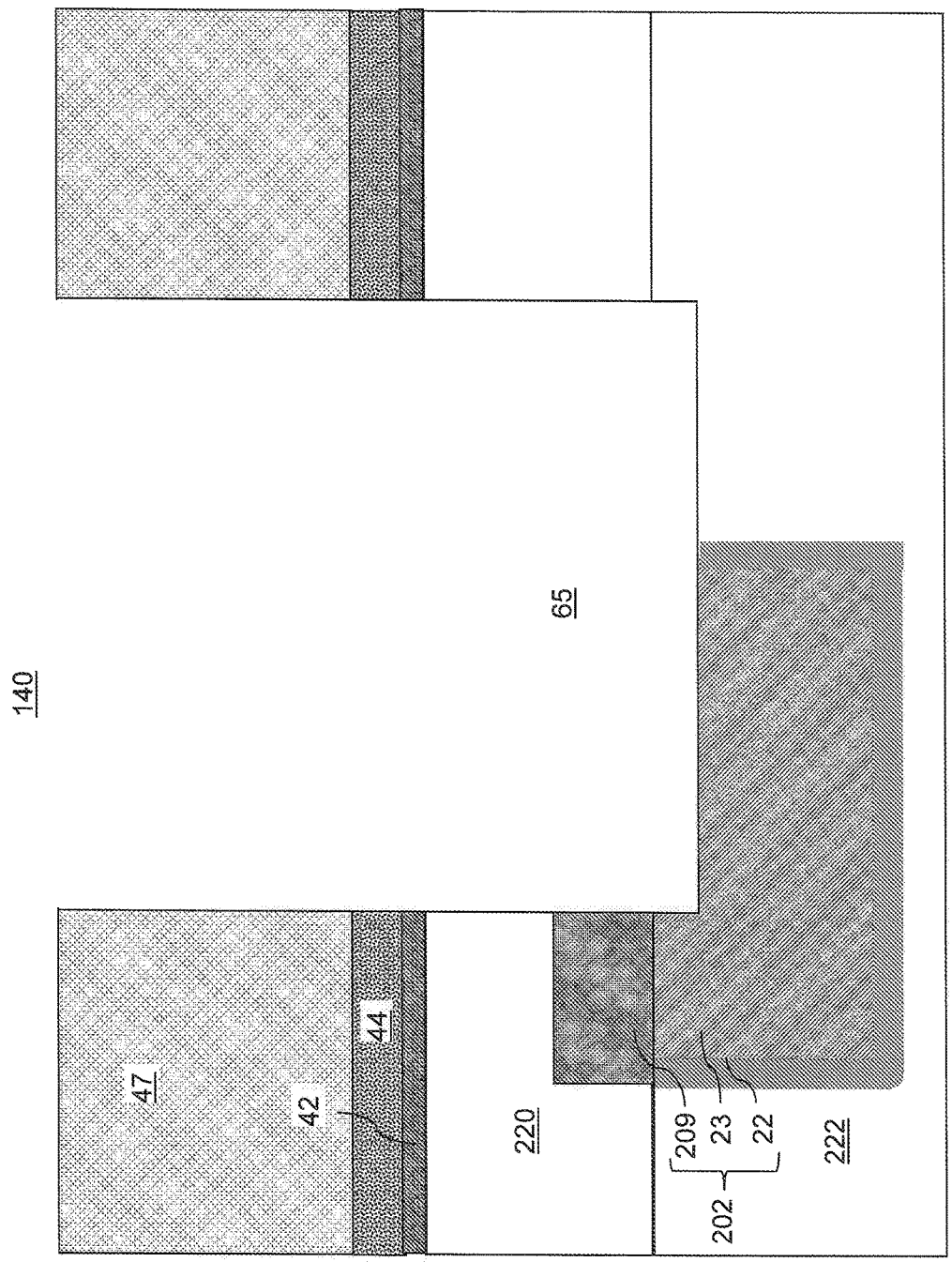
Figure 7D:
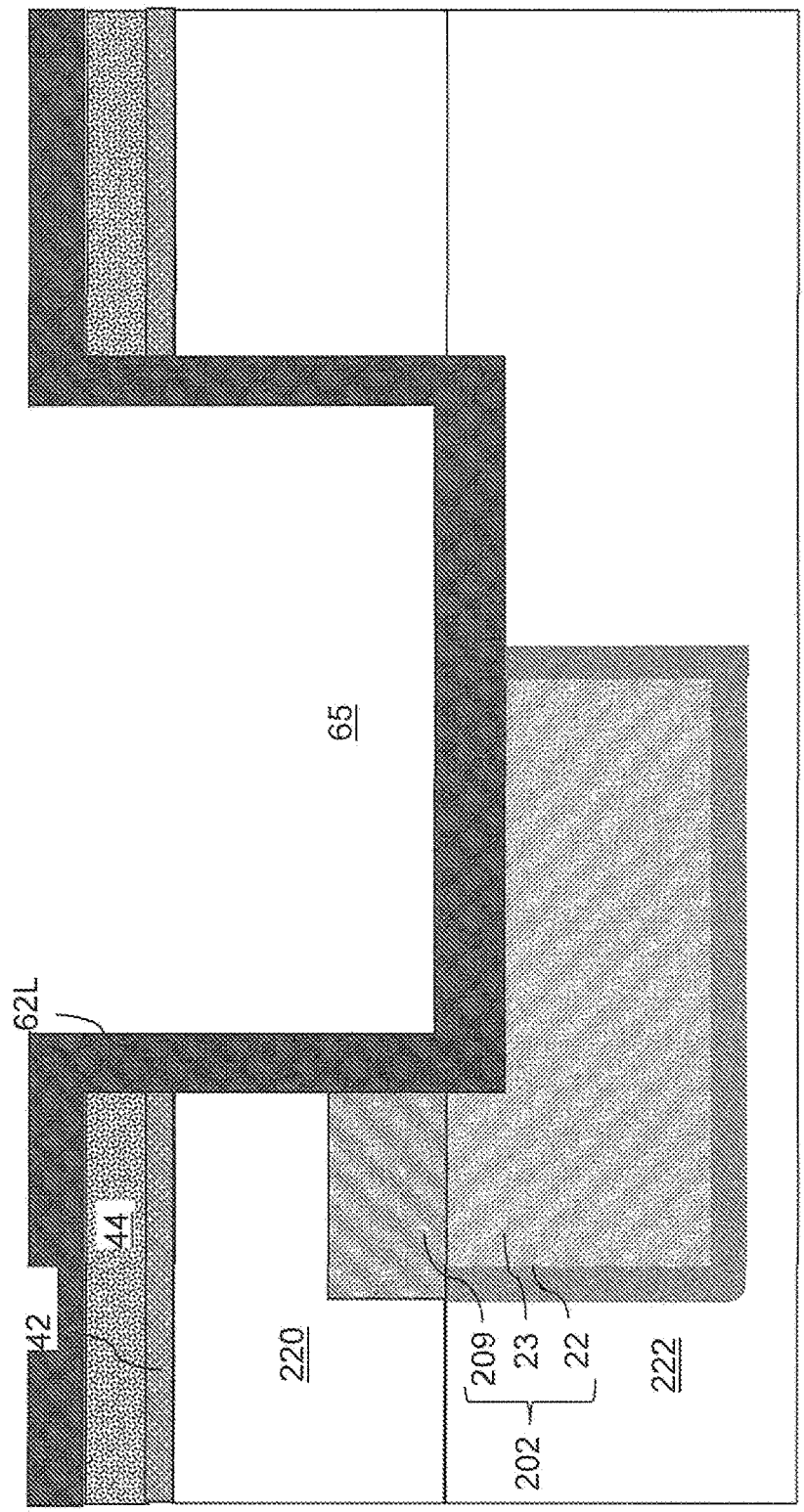
Figure 7E:
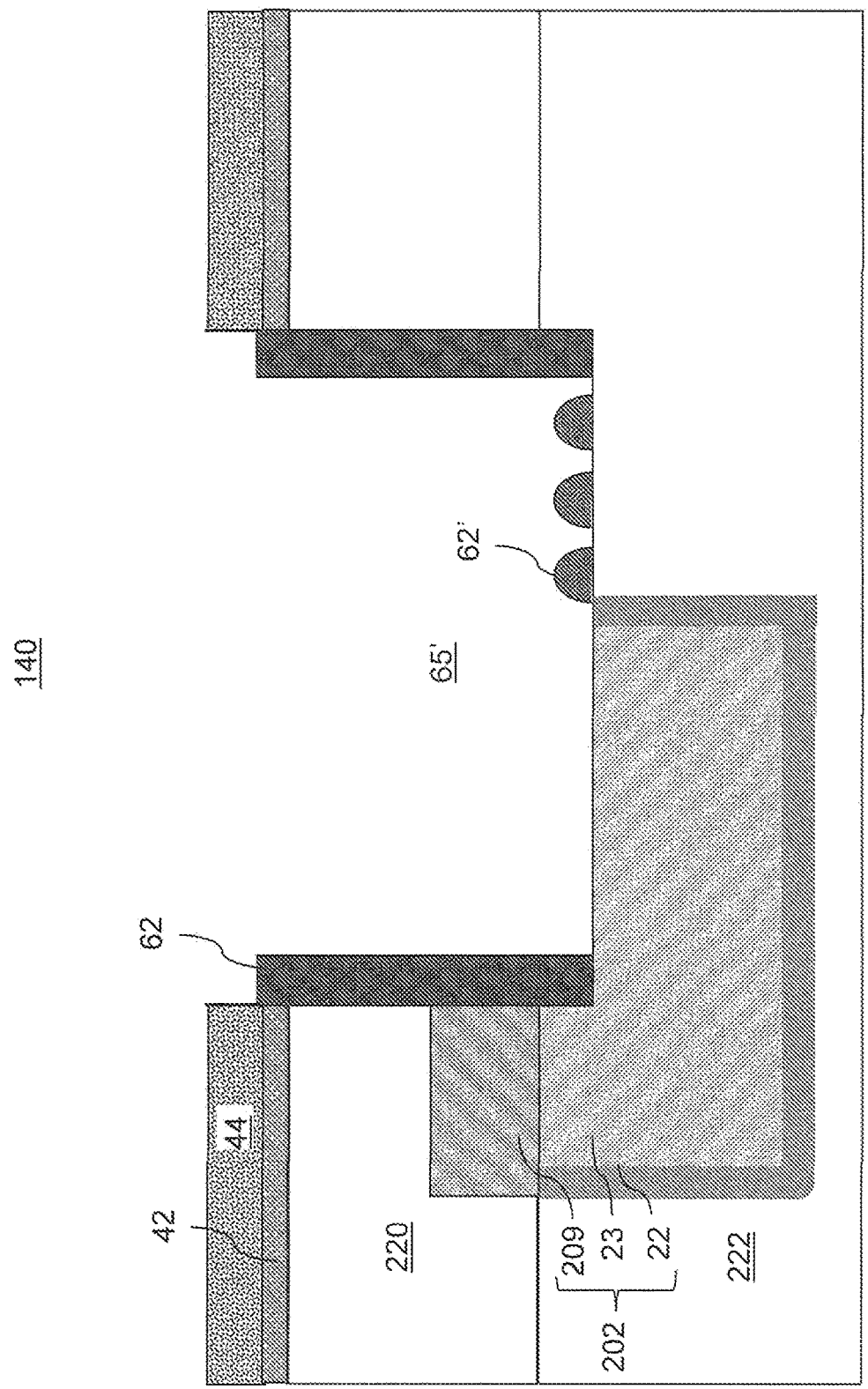
Figure 7F:
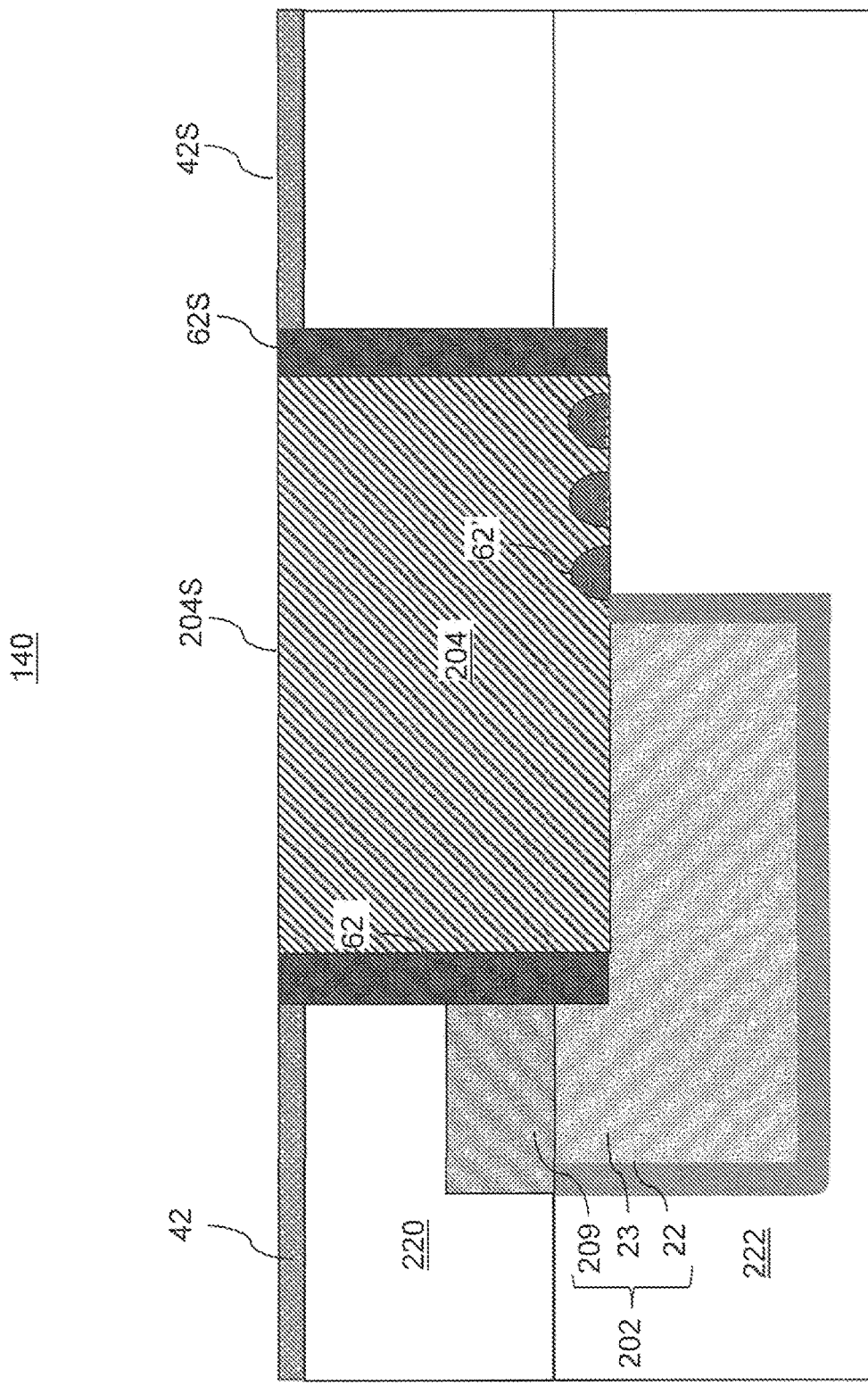

The antenna 202 illustrated in FIGS. 6F and 7F corresponds to the antenna 202 illustrated in FIGS. 5A and 5B, which may include the first portion 23 which corresponds to the first portion 203 illustrated in FIGS. 2A and 2B, or the first portion 302 illustrated in FIGS. 3A and 3B, or the first portion 402 illustrated in FIGS. 4A and 4B. The thermal shunt body portion 204 illustrated in FIGS. 6F and 7F corresponds to the thermal shunt 204 illustrated in FIGS. 2A and 2B, or 3A and 3B, or 4A and 4B.

FIGS. 6A and 7A illustrate an in-process near-field transducer 140 of the HAMR write head at a center region and at a peripheral region, respectively, after formation of the first portion 23 of the antenna 202. The antenna 202 may include first portion 23 which corresponds to any of the first portions (203, 302, 402) within the structures illustrated in FIG. 2A, 2B, 3A, 3B, 4A, or 4B. The antenna 202 may be formed in a first dielectric matrix layer 222, which corresponds to the cladding material 222 described above. Generally, a waveguide 135 may be formed over a substrate as described above, and an antenna 202 embedded in a first dielectric matrix layer 222 may be formed over the waveguide 135.

In one embodiment, the antenna 202 may be formed by patterning a recess region in an upper portion of the first dielectric matrix layer 222 such that the recess region has a basin portion and a shallow wing portion, and by filling the recess region with at least one metallic (e.g., pure metal or metal alloy) material. In one embodiment, at least one metallic material may comprise a first metallic material can function as a high-thermal-conductivity metallic material (i.e., a metallic material that can provide high thermal conductivity), and a second metallic material that can function as a metallic diffusion barrier material.

In an illustrative example, the metallic diffusion barrier material can be deposited first to form a metallic diffusion barrier layer, which is herein referred to as a near-field-transducer metallic diffusion barrier 22. In one embodiment, the metallic diffusion barrier material, i.e., the second material, may comprise, and/or consist essentially of, at least one material that is selected from Rh, Co, Ni, Pt, Pd, Ru, B, Mo, Nb, Ta, W, Ti, Os, Ir, or Re. In one embodiment, the recess depth of the shallow wing portion relative to the top surface of the first dielectric matrix layer 222 may be the same as the thickness of the near-field-transducer metallic diffusion barrier 22.

Subsequently, the high-thermal-conductivity metallic material can be deposited over the near-field-transducer metallic diffusion barrier 22. In one embodiment, the high-thermal-conductivity metallic material, i.e., the first metallic material, may comprise, and/or consist essentially of, at least one material that is selected from Au, Ag, Cu, or Al.

A planarization process, such as a chemical mechanical polishing process, may be performed to remove portions of the high-thermal-conductivity metallic material and the metallic diffusion barrier material from above the horizontal plane including the top surface of the first dielectric matrix layer 222. Portions of the near-field-transducer metallic diffusion barrier 22 located above the horizontal plane including the top surface of the first dielectric matrix layer 222 can be removed by the planarization process. Remaining portions of the near-field-transducer metallic diffusion barrier 22 may comprise a contoured portion that lines the bottom surface of the basin portion of the recess region and a horizontally-extending portion that fills the shallow wing portion of the recess region within the first dielectric matrix layer 222. A remaining portion of the high-thermal-conductivity metallic material filling the rest of the volume of the basin portion of the recess region constitutes the first portion 23 of the antenna 202. The first portion 23 of the antenna 202 can be spaced from the first dielectric matrix layer 222 by the near-field-transducer metallic diffusion barrier 22.

FIGS. 6B and 7B illustrate an in-process near-field transducer 140 of the HAMR write head 103 at a center region and at a peripheral region, respectively, after formation of the second portion 209 of the antenna 202, a second dielectric matrix layer 220, a metallic adhesion layer 42, and an etch mask layer 44. The second portion 209 of the antenna 202 includes a metallic diffusion barrier material. The material of the second portion 209 of the antenna 202 can comprise any material that may be employed for the near-field-transducer metallic diffusion barrier 22. For example, the second portion 209 of the antenna 202 may comprise, and/or consist essentially of, at least one material that is selected from Rh, Co, Ni, Pt, Pd, Ru, B, Mo, Nb, Ta, W, Ti, Os, Ir, or Re. The second portion 209 of the antenna 202 can be subsequently patterned as described above.

The second dielectric matrix layer 220 can be deposited over the first dielectric matrix layer 222 and the second portion 209 of the antenna 202. The second dielectric matrix layer 220 corresponds to the above described spacer layer 220 and may comprise any dielectric material that may be employed for the spacer layer 220. The top surface of the second dielectric matrix layer 220 may be planarized, for example, by a chemical mechanical polishing process.

The metallic adhesion layer 42 is deposited over the second dielectric matrix layer 220. In one embodiment, the metallic adhesion layer 42 comprises, and/or consists essentially of a metal or metal alloy, such as Ta, Ti, Cr, Ni, Co, Hf, Zr, oxide of the materials mentioned above, or nitride of the materials mentioned above.

The etch mask layer 44 comprises an etch mask material that can protect the metallic adhesion layer 42 and bottom layers during a subsequent ion milling process. In one embodiment, the etch mask layer 44 comprises a carbon material, such as amorphous carbon or diamond-like carbon (DLC).

FIGS. 6C and 7C illustrate an in-process near-field transducer 140 of the HAMR write head 103 at a center region and at a peripheral region, respectively, after formation of a via cavity 65 through the etch mask layer 44, the metallic adhesion layer 42, the second portion 209 of the antenna 202, the second dielectric matrix layer 220, and the first portion 23 of the antenna 202 and optionally into the first dielectric matrix layer 222 as shown in FIG. 7C. For example, a masking layer, such as a photoresist layer 47 may be applied over the etch mask layer 44, and can be lithographically patterned to form an opening in an area that overlies the antenna 202. An anisotropic etch process or an ion milling process may be performed to transfer the pattern of the opening in the photoresist layer 47 through the etch mask layer 44, the metallic adhesion layer 42, the second dielectric matrix layer 220, the second portion 209 of the antenna 202, and the first portion 23 of the antenna 202 and optionally into an upper portion of the first dielectric matrix layer 222. The vertical recess distance between a recessed top surface of the first portion 23 of the antenna 202 relative to the horizontal plane including the interface between the first insulating matrix layer 222 and the second insulating matrix layer 220 may be in a range from 0 nm to 30 nm, although greater vertical recess distances may also be employed. The sidewalls of the via cavity 65 may be vertical or substantially vertical. The photoresist layer 47 can be subsequently removed, for example, by stripping in a solvent.

FIGS. 6D and 7D illustrate an in-process near-field transducer 140 of the HAMR write head 103 at a center region and at a peripheral region, respectively, after formation of a metallic shunt diffusion barrier material layer 62L. The metallic shunt diffusion barrier material layer 62L includes a metallic diffusion barrier material, which may be any of the materials that may be employed for the second portion 209 of the antenna 202 or for the near-field-transducer metallic diffusion barrier 22. In one embodiment, the metallic shunt diffusion barrier material layer 62L may comprise, and/or consist essentially of, at least one material that is selected from Rh, Co, Ni, Pt, Pd, Ru, B, Mo, Nb, Ta, W, Ti, Os, Ir, or Re.

FIGS. 6E and 7E illustrate an in-process near-field transducer 140 of the HAMR write head 103 at a center region and at a peripheral region, respectively, after formation of a metallic shunt diffusion barrier 62 by removing horizontally-extending portions of the metallic shunt diffusion barrier material layer 62L. For example, an ion milling process may be performed, which removes the horizontally-extending portions of the metallic shunt diffusion barrier material layer 62L. During the ion milling process, a highly collimated ion beam of ions (e.g., argon ions) is provided in a direction which is substantially perpendicular to the top surface of the metallic shunt diffusion barrier material layer 62L located on the second dielectric matrix layer 220, such as within 0 to 5 degrees from a normal to the top surface of the metallic shunt diffusion barrier material layer 62L. The ions impinge on the horizontally-extending surfaces of the metallic shunt diffusion barrier material layer 62L, and mill (i.e., remove) the horizontally-extending portions of the metallic shunt diffusion barrier material layer 62L. The duration of the ion milling process can be selected such that a horizontal surface of the first portion 23 of the antenna 202 is physically exposed after the ion milling process. Thus, the ion milling process functions similar to an anisotropic sidewall spacer etch process which forms sidewall spacers on sidewalls of vertical features.

A remaining vertically-extending tubular portion of the metallic shunt diffusion barrier material layer 62L that contacts sidewalls of the via cavity 65 constitutes a metallic shunt diffusion barrier 62. A void 65' is present within an unfilled volume of the via cavity 65. In one embodiment, the sticking coefficient of metallic particles that are dislodged from the metallic shunt diffusion barrier material layer 62L during the ion milling process may differ between the physically exposed surface of the near-field-transducer body portion 23 and the physically exposed horizontal surface of the first dielectric matrix layer 222. In this case, metallic particles that are removed from remaining portions of the metallic shunt diffusion barrier material layer 62L and impinge on the physically exposed surface of the near-field-transducer body portion 23 have a lower probability of sticking to the physically exposed surface of the near-field-transducer body portion 23 than metallic particles that are removed from the remaining portions of the metallic shunt diffusion barrier material layer 62L and impinge on the physically exposed surface of the first dielectric matrix layer 222. This condition can lead to accumulation of re-deposited metallic particles 62' on the physically exposed horizontal surface of the first dielectric matrix layer 222, while a horizontal surface of the near-field-transducer body portion 23 is not covered with metallic particles 62', as shown in FIG. 7E.

In one embodiment, metallic particles 62' having the same material composition as the metallic shunt diffusion barrier 62 can be deposited on a physically exposed horizontally-extending surface segments of the first dielectric matrix layer 222 that are located within a same horizontal plane as a physically exposed horizontal surface of the first portion 23. In one embodiment, the metallic particles 62' may have a lesser thickness along the vertical direction (which is the direction that is perpendicular to the physically exposed horizontal surface of the first portion 23) than a thickness (i.e., the lateral thickness) of the metallic shunt diffusion barrier 62 at a sidewall of the second dielectric matrix layer 220. The etch mask layer 44 may optionally be removed during the ion milling or in a separate removal step (e.g., an ashing or a selective etching step).

FIGS. 6F and 7F illustrate an in-process near-field transducer 140 of the HAMR write head 103 at a center region and at a peripheral region, respectively, after formation of a thermal shunt body portion 204. For example, a high-thermal-conductivity metal can deposited in the void 65' in the via cavity 65 by a conformal or non-conformal deposition process. The high-thermal-conductivity metal may be any metal that may be employed for the first portion 23 of the antenna 202. For example, the high-thermal-conductivity metal may be selected from Au, Ag, Cu, or Al.

Excess portions of the high-thermal-conductivity metal may be removed from above the horizontal plane including the top surface of the metallic adhesion layer 42 by performing a planarization process, such as a chemical mechanical polishing process. If the etch mask layer 44 is present at this step, then it may be collaterally removed during the planarization process. A remaining portion of the high-thermal-conductivity material that fills the void 65' within the via cavity 65 constitutes the thermal shunt body portion 204. The combination of the metallic shunt diffusion barrier 62 and the thermal shunt body portion 204 constitutes the thermal shunt (62, 204), which may have the same general shape and the same function as the thermal shunt 204 illustrated in FIGS. 2A and 2B, 3A and 3B, or 4A and 4B. The near-field transducer 140 includes the combination of the antenna 202 and the thermal shunt (62, 204).

Generally, the thermal shunt body portion 204 can be formed directly on the antenna 202 and on an inner sidewall of the metallic shunt diffusion barrier 62. In one embodiment, the first portion 23 of the antenna 202 may consist essentially of a first metallic material, and the thermal shunt body portion 204 may consist essentially of the first metallic material or a different high-thermal-conductivity metal. A top surface 204S of the thermal shunt body portion 204 and a top surface 62S of the metallic shunt diffusion barrier 62 may be coplanar with a top surface 42S of the metallic adhesion layer 42.

The direct physical contact between the high-thermal-conductivity metals of the first portion 23 of the antenna 202 and the thermal shunt body portion 204 improves the heat transfer from the antenna 202 to the thermal shunt. Furthermore, metallic shunt diffusion barrier 62 prevents or reduces diffusion of the materials of the second dielectric matrix layer 220 and/or the adhesion layer 42 into the thermal shunt body portion 204. The reduction or prevention of diffusion of deleterious materials into the thermal shunt body portion 204 maintains the purity and thus the high thermal conductivity of the thermal shunt body portion 204, which improves the heat transfer from the thermal shunt to the heat sink described above. Finally, the metallic particles 62' in the peripheral portion of the near-field transducer 140 improve the adhesion of the thermal shunt body portion 204 to the underlying first dielectric matrix layer 222.

Subsequently, the main pole 142 and additional structures overlying the near-field transducer 140 as described in FIGS. 2A, 2B, 3A, 3B, 4A, and 4B may be formed to provide a heat assisted magnetic recording (HAMR) write head of the embodiments of the present disclosure.

Referring collectively to all drawings and according to various embodiments of the present disclosure, a heat assisted magnetic recording (HAMR) write head 103 includes a main pole 142, a waveguide 135, at least one dielectric matrix layer (220, 222), and a near-field transducer 140 disposed between the waveguide 135 and the main pole 142. The near field transducer 140 is embedded in at least one dielectric matrix layer (220, 222). The near-field transducer 140 includes an antenna 202 and a thermal shunt (62, 204). The thermal shunt includes a thermal shunt body portion 204 in direct contact with the antenna 202, and a metallic shunt diffusion barrier 62 laterally surrounding the thermal shunt body portion 204 and disposed between the thermal shunt body portion 204 and the at least one dielectric matrix layer (220, 222).

In one embodiment, the at least one dielectric matrix layer (220, 222) comprises a first dielectric matrix layer 222 embedding the antenna 202, and a second dielectric matrix layer 220 embedding the thermal shunt (62, 204). In one embodiment, a planar surface of the antenna 202 is coplanar with an interface between the first dielectric matrix layer 222 and the second dielectric matrix layer 220. In one embodiment, the thermal shunt body portion 204 is laterally spaced from the second dielectric matrix layer 220 by the metallic shunt diffusion barrier 62, and the thermal shunt body portion 204 does not directly contact the second dielectric matrix layer 220.

In one embodiment, first surface segments of the thermal shunt body portion 204 contact first surface segments of the first dielectric matrix layer 222. In one embodiment shown in FIG. 7F, metallic particles 62' are located between the thermal shunt body portion 204 and the first dielectric matrix layer 222. The metallic particles 62' contact second surface segments of the thermal shunt body portion 204 and second surface segments of the first dielectric matrix layer 222. In one embodiment, the first surface segments of the first dielectric matrix layer 222 and the second surface segments of the first dielectric matrix layer 222 are located within a same horizontal plane as an interface between the first portion 23 of the antenna 202 and the thermal shunt (62, 204). In one embodiment, the metallic particles 62' have a same material composition as the metallic shunt diffusion barrier 62.

In one embodiment, a metallic adhesion layer 42 is located on the at least one dielectric matrix layer (220, 222). A planar surface of the metallic adhesion layer 42 is coplanar with an end surface (e.g., the top end) of the metallic shunt diffusion barrier 62, and the metallic shunt diffusion barrier 62 contacts a sidewall of the metallic adhesion layer 42.

In one embodiment, the antenna 202 comprises a first portion 23 comprising a first metallic material, and a second portion 209 comprising a second metallic material having a higher melting point than the first metallic material. In one embodiment, the first material comprises at least one material that is selected from Au, Ag, Cu, or Al, and the second material comprises at least one material that is selected from Rh, Co, Ni, Pt, Pd, Ru, B, Mo, Nb, Ta, W, Ti, Os, Ir, or Re. The thermal shunt body portion 204 comprises at least one material that is selected from Au, Ag, Cu, or Al. The metallic shunt diffusion barrier 62 and the metallic particles 62' comprise at least one material that is selected from Rh, Co, Ni, Pt, Pd, Ru, B, Mo, Nb, Ta, W, Ti, Os, Ir, or Re.

In one embodiment, a hard disk drive 100 includes the HAMR write head 103, a magnetic read head 105 and a magnetic media 112.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All of the publications, patent applications and patents cited herein are incorporated herein by reference in their entirety.

What is claimed is:

1. A heat assisted magnetic recording (HAMR) write head comprising:
   a main pole;
   a waveguide;
   at least one dielectric matrix layer; and
   a near-field transducer disposed between the waveguide and the main pole, wherein the near-field transducer is embedded in at least one dielectric matrix layer;
   wherein the near-field transducer comprises:
      an antenna; and
      a thermal shunt, wherein the thermal shunt comprises a thermal shunt body portion in direct contact with the antenna and a metallic shunt diffusion barrier laterally surrounding the thermal shunt body portion and disposed between the thermal shunt body portion and the at least one dielectric matrix layer; and
   wherein the at least one dielectric matrix layer comprises:
      a first dielectric matrix layer embedding the antenna; and
      a second dielectric matrix layer embedding the thermal shunt.

2. The HAMR write head of claim 1, wherein a planar surface of the antenna is coplanar with an interface between the first dielectric matrix layer and the second dielectric matrix layer.

3. The HAMR write head of claim 1, wherein the thermal shunt body portion is laterally spaced from the second dielectric matrix layer by the metallic shunt diffusion barrier, and the thermal shunt body portion does not directly contact the second dielectric matrix layer.

4. The HAMR write head of claim 1, wherein first surface segments of the thermal shunt body portion contact first surface segments of the first dielectric matrix layer.

5. The HAMR write head of claim 4, further comprising metallic particles located between the thermal shunt body portion and the first dielectric matrix layer, wherein the metallic particles contact second surface segments of the thermal shunt body portion and second surface segments of the first dielectric matrix layer.

6. The HAMR write head of claim 5, wherein the metallic particles have a same material composition as the metallic shunt diffusion barrier.

7. The HAMR write head of claim 6, wherein the metallic particles and the metallic shunt diffusion barrier comprise the same material composition that is selected from Rh, Co, Ni, Pt, Pd, Ru, B, Mo, Nb, Ta, W, Ti, Os, Ir, or Re.

8. A heat assisted magnetic recording (HAMR) write head comprising:
a main pole;
a waveguide;
at least one dielectric matrix layer; and
a near-field transducer disposed between the waveguide and the main pole, wherein the near-field transducer is embedded in at least one dielectric matrix layer;
wherein the near-field transducer comprises:
an antenna; and
a thermal shunt, wherein the thermal shunt comprises a thermal shunt body portion in direct contact with the antenna and a metallic shunt diffusion barrier laterally surrounding the thermal shunt body portion and disposed between the thermal shunt body portion and the at least one dielectric matrix layer; and
further comprising a metallic adhesion layer located on the at least one dielectric matrix layer, wherein a planar surface of the metallic adhesion layer is coplanar with an end surface of the metallic shunt diffusion barrier, and the metallic shunt diffusion barrier contacts a sidewall of the metallic adhesion layer.

9. A heat assisted magnetic recording (HAMR) write head comprising:
a main pole;
a waveguide;
at least one dielectric matrix layer; and
a near-field transducer disposed between the waveguide and the main pole, wherein the near-field transducer is embedded in at least one dielectric matrix layer;
wherein the near-field transducer comprises:
an antenna; and
a thermal shunt, wherein the thermal shunt comprises a thermal shunt body portion in direct contact with the antenna and a metallic shunt diffusion barrier laterally surrounding the thermal shunt body portion and disposed between the thermal shunt body portion and the at least one dielectric matrix layer; and
wherein the antenna comprises:
a first portion comprising a first metallic material; and
a second portion comprising a second metallic material having a higher melting point than the first metallic material.

10. The HAMR write head of claim 9, wherein:
the first material comprises at least one material that is selected from Au, Ag, Cu, or Al;
the second material comprises at least one material that is selected from Rh, Co, Ni, Pt, Pd, Ru, B, Mo, Nb, Ta, W, Ti, Os, Ir, or Re;
the thermal shunt body portion comprises at least one material that is selected from Au, Ag, Cu, or Al; and
the metallic shunt diffusion barrier comprises at least one material that is selected from Rh, Co, Ni, Pt, Pd, Ru, B, Mo, Nb, Ta, W, Ti, Os, Ir, or Re.

11. A hard disk drive, comprising:
a heat assisted magnetic recording (HAMR) write head;
a magnetic read head; and
a magnetic media;
wherein the HAMR write head comprises:
a main pole;
a waveguide;
at least one dielectric matrix layer; and
a near-field transducer disposed between the waveguide and the main pole, wherein the near-field transducer is embedded in at least one dielectric matrix layer;
wherein the near-field transducer comprises:
an antenna; and
a thermal shunt, wherein the thermal shunt comprises a thermal shunt body portion in direct contact with the antenna and a metallic shunt diffusion barrier laterally surrounding the thermal shunt body portion and disposed between the thermal shunt body portion and the at least one dielectric matrix layer.

12. A method of forming a heat assisted magnetic recording (HAMR) write head, comprising:
forming a waveguide over a substrate;
forming a first dielectric matrix layer over the waveguide;
forming an antenna embedded in the first dielectric matrix layer;
forming a second dielectric matrix layer over the antenna and the first dielectric matrix layer;
forming a via cavity through the second dielectric matrix layer over the antenna;
forming metallic shunt diffusion barrier on a sidewall of the via cavity;
forming a thermal shunt body portion directly on the antenna and on an inner sidewall of the metallic shunt diffusion barrier; and
forming a main pole over the thermal shunt body portion.

13. The method of claim 12, wherein the step of forming the metallic shunt diffusion barrier on the sidewall of the via cavity comprises:
forming a metallic shunt diffusion barrier layer over the second dielectric matrix layer, over the sidewall of the via cavity and over a portion of the antenna exposed in the via cavity; and
ion milling the metallic shunt diffusion barrier layer using an ion beam which is substantially perpendicular to a horizontal surface of the metallic shunt diffusion barrier layer located over the first dielectric matrix layer.

14. The method of claim 13, wherein metallic particles of the metallic shunt diffusion barrier remain on a surface of the first dielectric matrix layer below the thermal shunt body portion after the ion milling.

15. The method claim 12, wherein the antenna comprises:
a first portion comprising a first metallic material; and
a second portion comprising a second metallic material having a higher melting point than the first metallic material.

16. The method claim 15, wherein:
first material comprises at least one material that is selected from Au, Ag, Cu, or Al;
the second material comprises at least one material that is selected from Rh, Co, Ni, Pt, Pd, Ru, B, Mo, Nb, Ta, W, Ti, Os, Ir, or Re; and
the metallic shunt diffusion barrier comprises at least one material that is selected from Rh, Co, Ni, Pt, Pd, Ru, B, Mo, Nb, Ta, W, Ti, Os, Ir, or Re.

17. The method claim 16, wherein:
the thermal shunt body portion is formed directly on the first portion of the antenna; and
the thermal shunt body portion comprises at least one material that is selected from Au, Ag, Cu, or Al.

18. The method claim 16, wherein the thermal shunt body portion is laterally spaced from the second dielectric matrix layer by the metallic shunt diffusion barrier, and the thermal shunt body portion does not directly contact the second dielectric matrix layer.

19. The method claim 12, further comprising forming a metallic adhesion layer on the second dielectric matrix layer, wherein the metallic shunt diffusion barrier contacts a sidewalls of the metallic adhesion layer.

* * * * *